United States Patent
Ohno

(10) Patent No.: US 10,230,930 B2
(45) Date of Patent: Mar. 12, 2019

(54) IMAGE PROJECTION APPARATUS

(71) Applicant: Kouji Ohno, Chiba (JP)

(72) Inventor: Kouji Ohno, Chiba (JP)

(73) Assignee: Ricoh Company Ltd., Tokyo (JP)

( * ) Notice: Subject to any disclaimer, the term of this patent is extended or adjusted under 35 U.S.C. 154(b) by 0 days.

(21) Appl. No.: 15/813,921

(22) Filed: Nov. 15, 2017

(65) Prior Publication Data

US 2018/0146179 A1    May 24, 2018

(30) Foreign Application Priority Data

Nov. 24, 2016  (JP) .................. 2016-228007

(51) Int. Cl.
*G03B 17/54* (2006.01)
*H04N 9/31* (2006.01)
*G03B 21/14* (2006.01)
*G09G 3/00* (2006.01)
*H04N 3/233* (2006.01)

(52) U.S. Cl.
CPC ......... *H04N 9/3185* (2013.01); *G03B 21/145* (2013.01); *G09G 3/002* (2013.01); *H04N 3/2335* (2013.01); *H04N 9/3182* (2013.01); *G03B 17/54* (2013.01); *G03B 21/147* (2013.01)

(58) Field of Classification Search
CPC .. H04N 9/3185; H04N 3/2335; H04N 9/3182; G03B 17/54; G03B 21/145; G03B 21/147; G09G 3/002
USPC .......................................................... 353/70
See application file for complete search history.

(56) References Cited

U.S. PATENT DOCUMENTS

| 6,456,340 B1 * | 9/2002 | Margulis | G06T 1/20 345/501 |
| 2011/0157232 A1 * | 6/2011 | Ishii | H04N 9/3185 345/660 |
| 2011/0234650 A1 * | 9/2011 | Watanabe | G09G 3/003 345/690 |

(Continued)

FOREIGN PATENT DOCUMENTS

| JP | 2001350196 A | 12/2001 |
| JP | 2007248894 A | 9/2007 |

(Continued)

*Primary Examiner* — Steven H Whitesell
*Assistant Examiner* — Jerry Brooks
(74) *Attorney, Agent, or Firm* — Harness, Dickey & Pierce, P.L.C.

(57) ABSTRACT

An image projection apparatus includes an image generation element to form an image using light emitted from a light source, a shift unit to shift a position of the image generation element when a pixel shift mode is set, circuitry to generate, when the pixel shift mode is set, images used for the pixel shift mode based on image data input to the image projection apparatus, perform keystone correction processing to the generated images, and cause the processed images to be projected as the image by reciprocally shifting the position of the image generation element, or to perform, when the pixel shift mode is not set, the keystone correction processing to image data input to the image projection apparatus to generate an image applied with the keystone correction processing, and project the generated image without shifting the position of the image generation element.

6 Claims, 23 Drawing Sheets

(56) References Cited

U.S. PATENT DOCUMENTS

| | | | |
|---|---|---|---|
| 2013/0145396 A1* | 6/2013 | Sung | G06F 1/3203 |
| | | | 725/40 |
| 2016/0154294 A1 | 6/2016 | Fujioka et al. | |
| 2016/0198134 A1 | 7/2016 | Mikawa et al. | |
| 2016/0277716 A1 | 9/2016 | Mikawa et al. | |
| 2016/0377926 A1* | 12/2016 | Matsumori | G02F 1/133723 |
| | | | 349/124 |
| 2017/0244940 A1 | 8/2017 | Mikawa et al. | |

FOREIGN PATENT DOCUMENTS

| | | | |
|---|---|---|---|
| JP | 2008070494 A | 3/2008 |
| JP | 2012037826 A | 2/2012 |
| JP | 2014119472 A | 6/2014 |
| JP | 2016085363 A | 5/2016 |
| JP | 2016110019 A | 6/2016 |

\* cited by examiner

SHIFT PIXEL BY ONE-HALF
OF PIXEL (XL/2, YL/2)

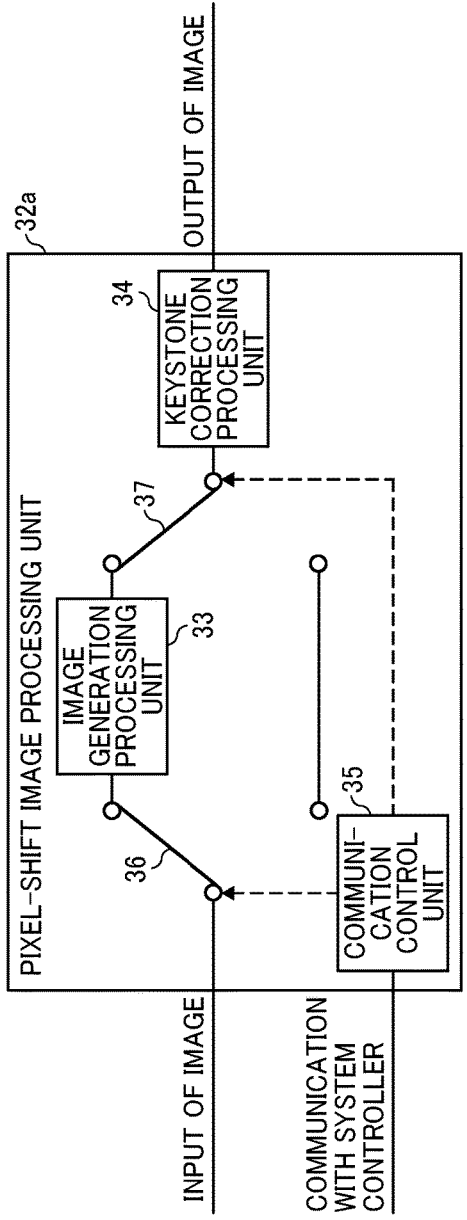
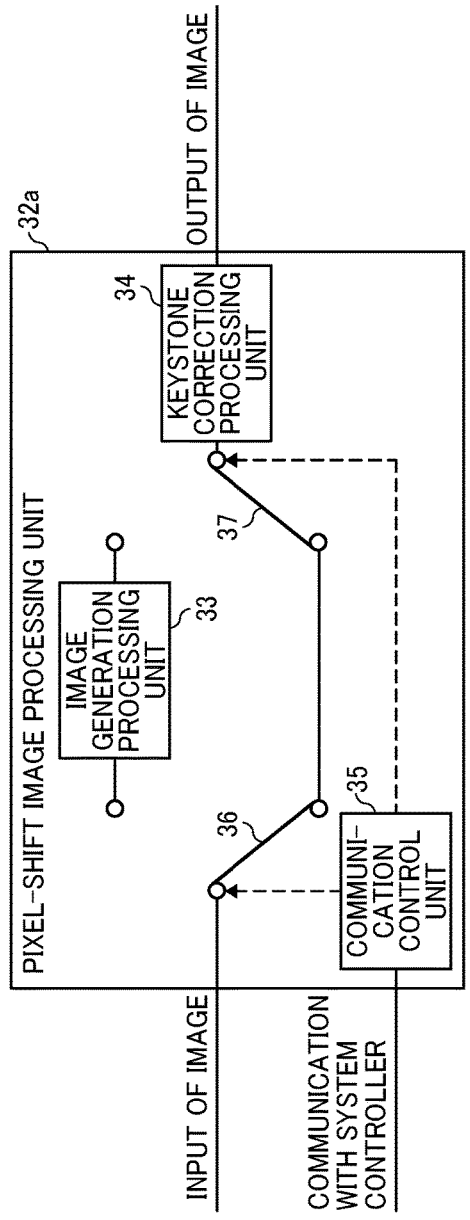
FIG. 22A
FIG. 22B

IMAGE PROJECTION APPARATUS

CROSS-REFERENCE TO RELATED APPLICATION

This application claims priority pursuant to 35 U.S.C. § 119(a) to Japanese Patent Application No. 2016-228007, filed on Nov. 24, 2016 in the Japan Patent Office, the disclosure of which is incorporated by reference herein in its entirety.

BACKGROUND

Technical Field

This disclosure relates to an image projection apparatus.

Background Art

Image projection apparatuses that project images on a projection face (e.g., screen) are used in a wide range of fields for display to a large number of people such as presentations, conferences, lecture meetings, educational sites, and home theaters. When the image projection apparatus receives image data transmitted from an information processing apparatus such as a personal computer, a video reproduction device such as a digital versatile disk (DVD) player, an imaging device such as a digital camera, an optical image generation element (or modulation element, image generation element) generates an image based on the received image data, and then the image is projected on a projection face (e.g., screen) through an optical system including a plurality of lenses or the like.

As to the image projection apparatuses widely used in presentations, conferences, lectures, meetings, educational institutions, movie viewing, and signage for a large number of people, image quality has been enhanced. The image quality projected by the image projection apparatuses can be increased by increasing the pixel density of the image generation element, but this results in increase in the manufacturing cost of the image generation element.

When an image projection apparatus is used for projecting images, the image projection apparatus may not be set at a position in the exact front of a projection face, in which the image projection is performed from an oblique direction with respect to the projection face. In this case, since distortion occurs in the projected image, conventional image projection apparatuses have a keystone distortion correcting function for correcting the distortion. The keystone correction processing is performed for image signals (original images) input to the image projection apparatus to generate an image having a smallest image deterioration.

In the image projection apparatus that performs the pixel shift control, two images (two frames) are generated from one original image (one frame) input to the image projection apparatus before outputting the two images to the image generation element, and the generated two images (two frames) are alternately output by synchronizing with the movement of an optical element or the image generation element.

However, if the image processing of the pixel shift control is performed to the images applied with the keystone correction processing, degradation of the image quality becomes greater and visibility is reduced.

SUMMARY

As one aspect of the present invention, an image projection apparatus is devised. The image projection apparatus includes an image generation element to form an image to be projected using light emitted from a light source, a shift unit to shift a position of the image generation element when a pixel shift mode is set, circuitry to generate, when the pixel shift mode is set, images used for the pixel shift mode based on image data input to the image projection apparatus, perform keystone correction processing to the generated images, and cause the processed images to be projected as the image by reciprocally shifting the position of the image generation element by the shift unit, or to perform, when the pixel shift mode is not set, the keystone correction processing to image data input to the image projection apparatus to generate an image applied with the keystone correction processing, and project the generated image without shifting the position of the image generation element by the shift unit.

As another aspect of the present invention, an image projection apparatus is devised. The image projection apparatus includes an image generation element to form an image to be projected using light emitted from a light source, an optical element disposed at a position after the image generation element in a light path of the light emitted from the light source, a shift unit to shift the position of the optical element when a pixel shift mode is set, circuitry to generate, when the pixel shift mode is set, images used for the pixel shift mode based on image data input to the image projection apparatus, perform keystone correction processing to the generated images, and cause the processed images to be projected as the image by reciprocally shifting the position of the optical element by the shift unit, or to perform, when the pixel shift mode is not set, the keystone correction processing to image data input to the image projection apparatus to generate an image applied with the keystone correction processing, and project the generated image without shifting the position of the optical element by the shift unit.

As another aspect of the present invention, an image projection apparatus is devised. The image projection apparatus includes an image generation element to form an image to be projected using light emitted from a light source, an optical projection unit including one or more lenses to project the image generated by the image generation element, an optical element having birefringence property disposed at a position between the image generation element and the optical projection unit, a shift unit to shift the position of the optical element having birefringence property when a pixel shift mode is set, circuitry to generate, when the pixel shift mode is set, images used for the pixel shift mode based on image data input to the image projection apparatus, perform keystone correction processing to the generated images, and cause the processed images to be projected as the image by reciprocally shifting the position of the optical element having birefringence property by the shift unit, or to perform, when the pixel shift mode is not set, the keystone correction processing to image data input to the image projection apparatus to generate an image applied with the keystone correction processing, and project the generated image without shifting the position of the optical element having birefringence property by the shift unit.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIGS. 22A and 22B illustrate another example of a functional block diagram of a pixel-shift image processing unit;

Figure 1A:
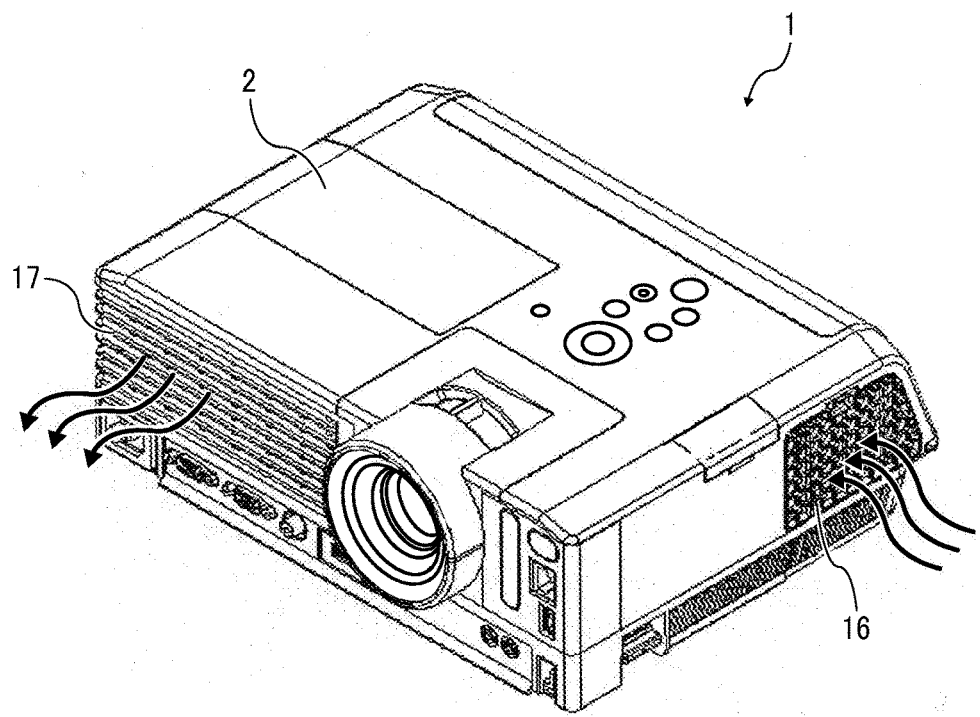
FIG. 1A is a perspective view of an image projection apparatus of an embodiment of the present invention.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of present disclosure. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of present disclosure.

In addition, it should be noted that the terminology used herein is for the purpose of describing particular embodiments only and is not intended to be limiting of present disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof. Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more embodiments are described hereinafter.

Hereinafter, a description is given of one or more embodiments of the present invention with reference to drawings of FIGS. 1 to 23.

(First Embodiment)
(Image Projection Apparatus)

Figure 1B:
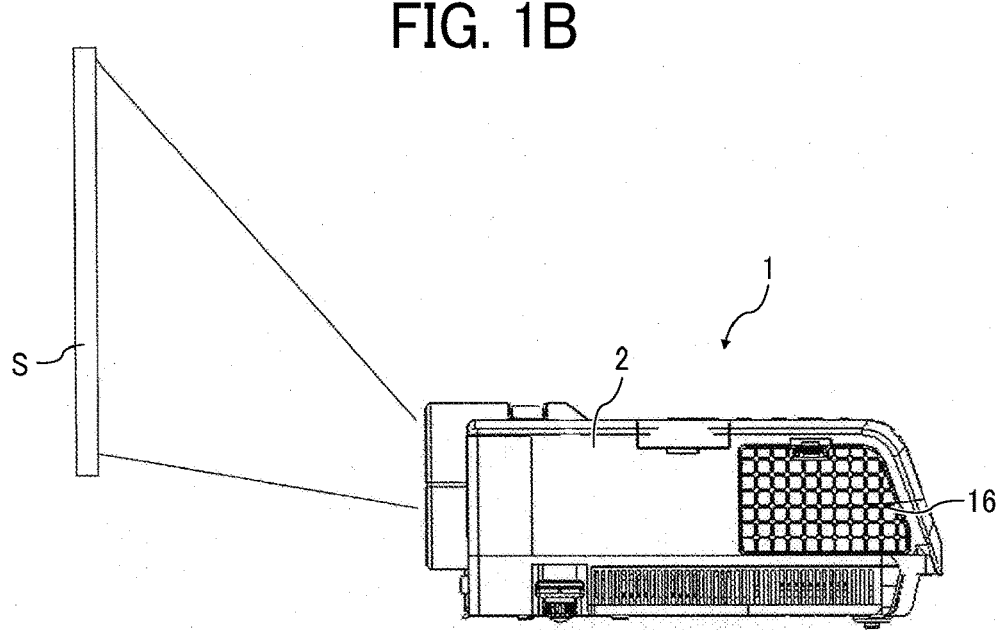
FIG. 1B is a side view of the image projection apparatus of FIG. 1A, and the image projection apparatus projects an image on a screen used as a projection face.

FIG. 1A is a perspective view of an image projection apparatus 1 of an embodiment of the present invention. FIG. 1B is a side view of the image projection apparatus 1, and the image projection apparatus 1 projects an image on a screen S used as a projection face.

Figure 2A:
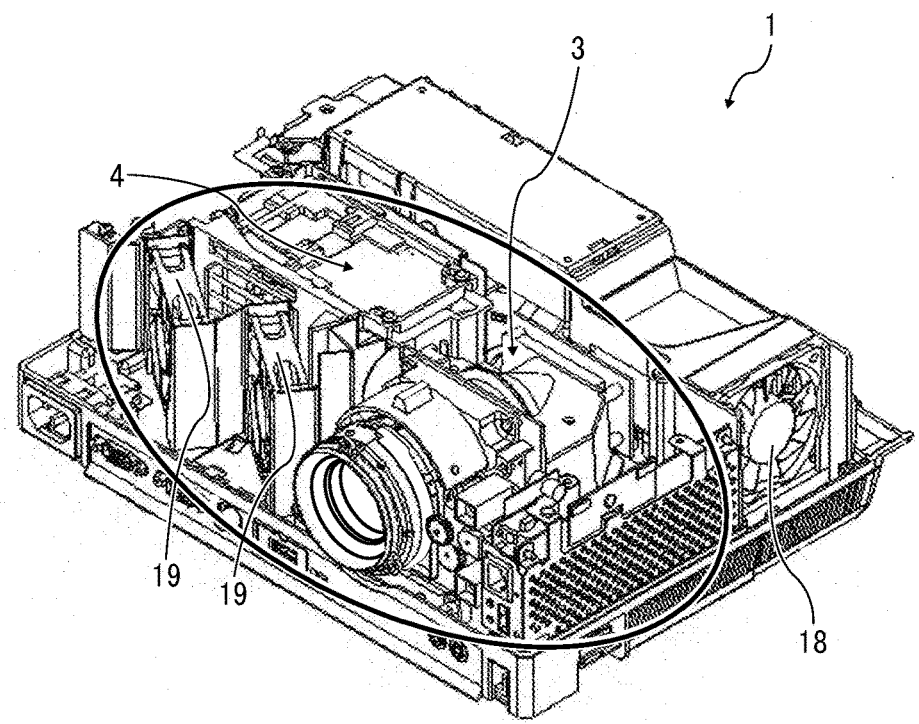
FIG. 2A is a perspective view of an internal configuration of the image projection apparatus of FIG. 1 from which an outer casing is removed.
Figure 2B:
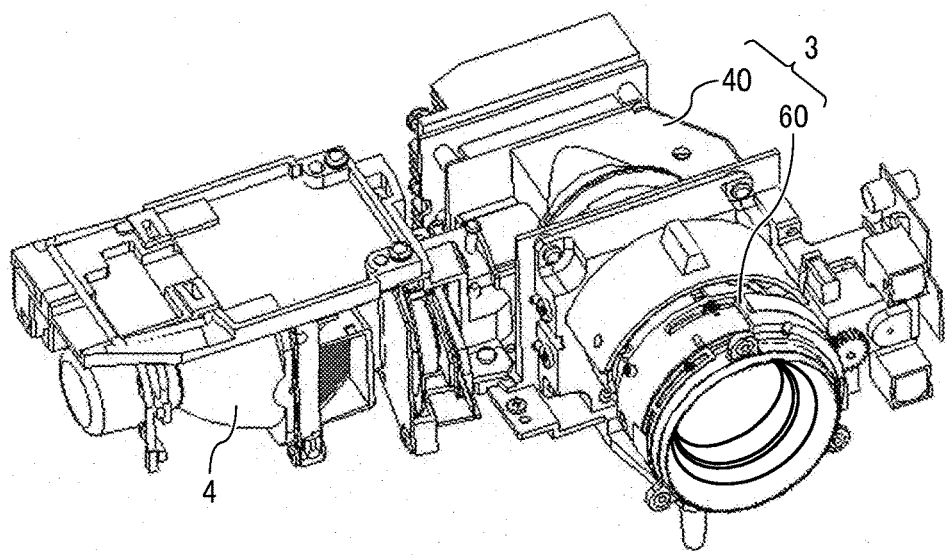
FIG. 2B is a perspective view of an encircled portion in FIG. 2A.

FIG. 2A is a perspective view of an internal configuration of the image projection apparatus 1 from which an outer casing 2 is removed. FIG. 2B is a perspective view of an encircled portion in FIG. 2A, in which an optical engine 3 and a light source unit 4 are included.

The image projection apparatus 1 has a lamp as a light source, and many electronic circuit boards inside the image projection apparatus 1. Therefore, the internal temperature of the image projection apparatus 1 rises after the image projection apparatus 1 is activated and being operated along the time line. Lately, the rise of internal temperature becomes prominent as the size of the casing of the image projection apparatus 1 has been reduced. Therefore, as illustrated in FIG. 1, the image projection apparatus 1 includes, for example, an intake port 16 and an exhaust port 17 to introduce air inside the image projection apparatus 1, and then to exhaust heated air outside the image projection apparatus 1 so that the temperature of the internal components does not exceed heatproof temperature of the internal components.

Figure 3:
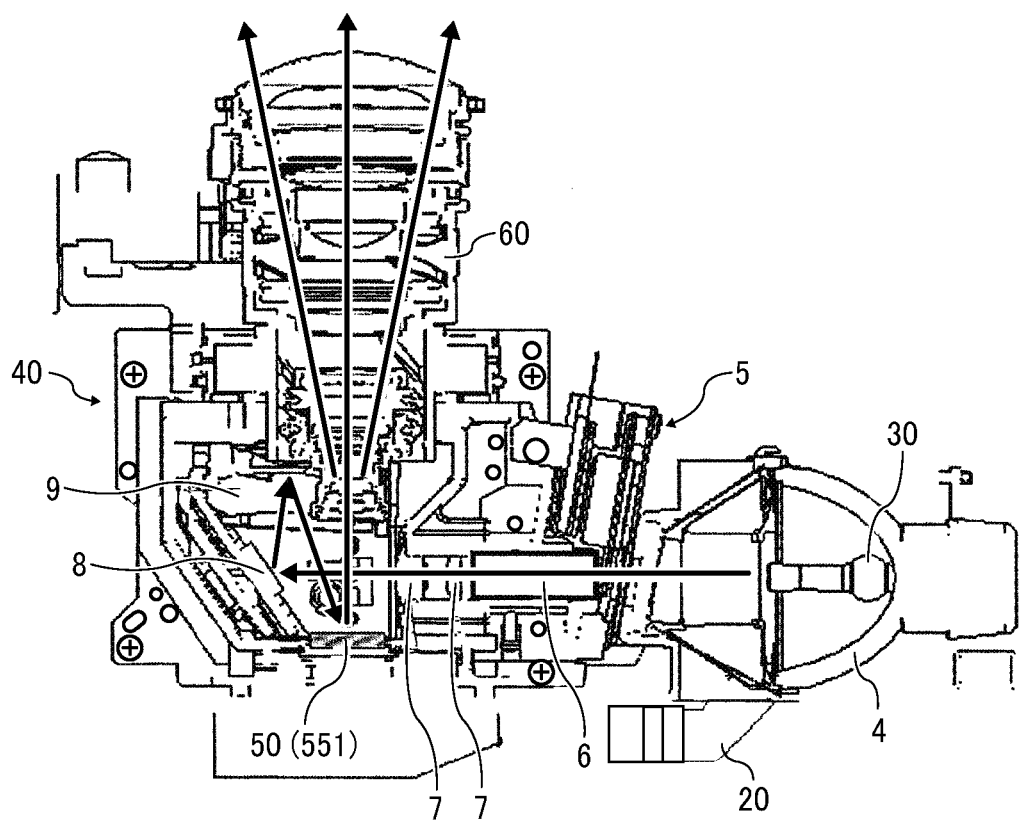
FIG. 3 is a cross-sectional view of a light guide unit, an optical projection unit, an image generation unit, and a light source unit of the image projection apparatus of FIG. 1.

Further, as illustrated in FIG. 2A and FIG. 2B, the image projection apparatus 1 includes, for example, the optical engine 3 and the light source unit 4. FIG. 3 is a cross-sectional view of a light guide unit 40 to guide light emitted from the light source unit 4, an optical projection unit 60, an image generation unit 50, and the light source unit 4 when viewed from a top side of the image projection apparatus 1. The optical engine 3 includes, for example, the light guide unit 40, the image generation unit 50, and the optical projection unit 60 as illustrated in FIG. 3.

As illustrated in FIG. 2A, an intake fan 18 is disposed inside the image projection apparatus 1 near the intake port 16, and an exhaust fan 19 is disposed inside the image projection apparatus 1 near the exhaust port 17. When air is introduced from the intake fan 18 inside the image projection apparatus 1, and then heated air is exhausted from the exhaust fan 19, the internal space and components of the image projection apparatus 1 can be cooled by a forced air flow.

In the image projection apparatus 1, light (e.g., white light) coming from a light source in the light source unit 4 enters the light guide unit 40 of the optical engine 3. Inside the light guide unit 40, the white light is separated into red, green, and blue (RGB) light components, and then guided to the image generation unit 50 via a lens and a mirror. Then, an image is generated or formed by the image generation unit 50 based on modulation signals, and the image is magnified and projected to the screen S by the optical projection unit 60.

As illustrated in FIG. 3, the light source unit 4 includes, for example, a light source 30. The light source 30 employs various lamps such as arc lamps including a high pressure mercury lamp, a xenon lamp or the like. For example, a high pressure mercury lamp is used as the light source 30.

As illustrated in FIG. 3, a light source cooling fan 20 is disposed at one side of the light source unit 4 to cool the light source 30. The rotation speed of the light source cooling fan 20 is controlled so that temperature of each part of the light source unit 4 is within the rated temperature range set for each part of the light source unit 4. Further, the emission direction of the light from the light source unit 4 and the emission direction of the image light from the optical projection unit 60 are set with a relationship of approximately 90 degrees as illustrated in FIG. 3. In this description, the light source cooling fan 20 is used as an example of the cooling device. As long as the cooling device can cool the light source unit 4, any cooling devices can be used.

Further, in the optical engine 3, the light guide unit 40 includes, for example, a color wheel 5, a light tunnel 6, two relay lenses 7, a flat mirror 8, and a concave mirror 9. The color wheel 5 (e.g., disk-shaped rotatable color filter) separates light emitted from the light source 30. The light tunnel 6 guides the light exiting from the color wheel 5. Further, the light guide unit 40 includes, for example, the image generation unit 50.

In the light guide unit 40, as indicated by arrows of FIG. 3, the white light, which is the light emitted from the light source 30, is separated into R (red), G (green), and B (blue) light components time divisionally when the light emitted from the light source 30 passes through the color wheel 5 rotating in one direction. The R (red), G (green), and B (blue) light components exiting from the color wheel 5 enter the light tunnel 6. The light tunnel 6 is a tube-shaped member having a square-like cross shape, and its internal face is finished as a mirror face. Each of the light components that enters the light tunnel 6 reflects for a plurality of times on the internal face of the light tunnel 6, and is then emitted as synthesized uniform light to the two relay lenses 7. Therefore, the light tunnel 6 is used as an optical member to convert the light into uniformed light.

Then, the light exiting from the light tunnel 6 enters the two relay lenses 7, in which the light is condensed while correcting the chromatic aberration along the light axis by the two relay lenses 7, which is a combination of two lenses. The light exiting from the two relay lenses 7 is reflected by the flat mirror 8 and the concave mirror 9, and then enters the image generation unit 50. The image generation unit 50 includes, for example, a digital micromirror device (DMD) 551 used as an image generation element or modulation element. The DMD 551 includes, for example, a plurality of micromirrors, and the plurality of micromirrors configure a substantially rectangular mirror surface. When each of the micromirrors is driven by a time division control based on image data, the light is processed and reflected by the DMD 551 to generate an image light.

The image generation unit 50 selects the light that is output to the optical projection unit 60 by switching on and off of the micromirrors based on the input signals, and generates the gradation by controlling the micromirrors. Specifically, the light used for a projection image is reflected to a projection lens by the plurality of micromirrors, and the light to be discarded is reflected to an OFF plate by the DMD 551 based on image data in a time division manner. The image light generated by the image generation unit 50 is reflected to the optical projection unit 60, passes through the plurality of projection lenses disposed in the optical projection unit 60, and then projected onto the screen S as an enlarged image.

Further, the incident side of the two relay lenses 7, the flat mirror 8, the concave mirror 9, the image generation unit 50, and the optical projection unit 60 inside the light guide unit 40 is covered by a housing, and the mating surface of the housing is sealed with a sealant to configure a dust-proof structure.

(Basic Configuration of Image Projection Apparatus)

Figure 4A:
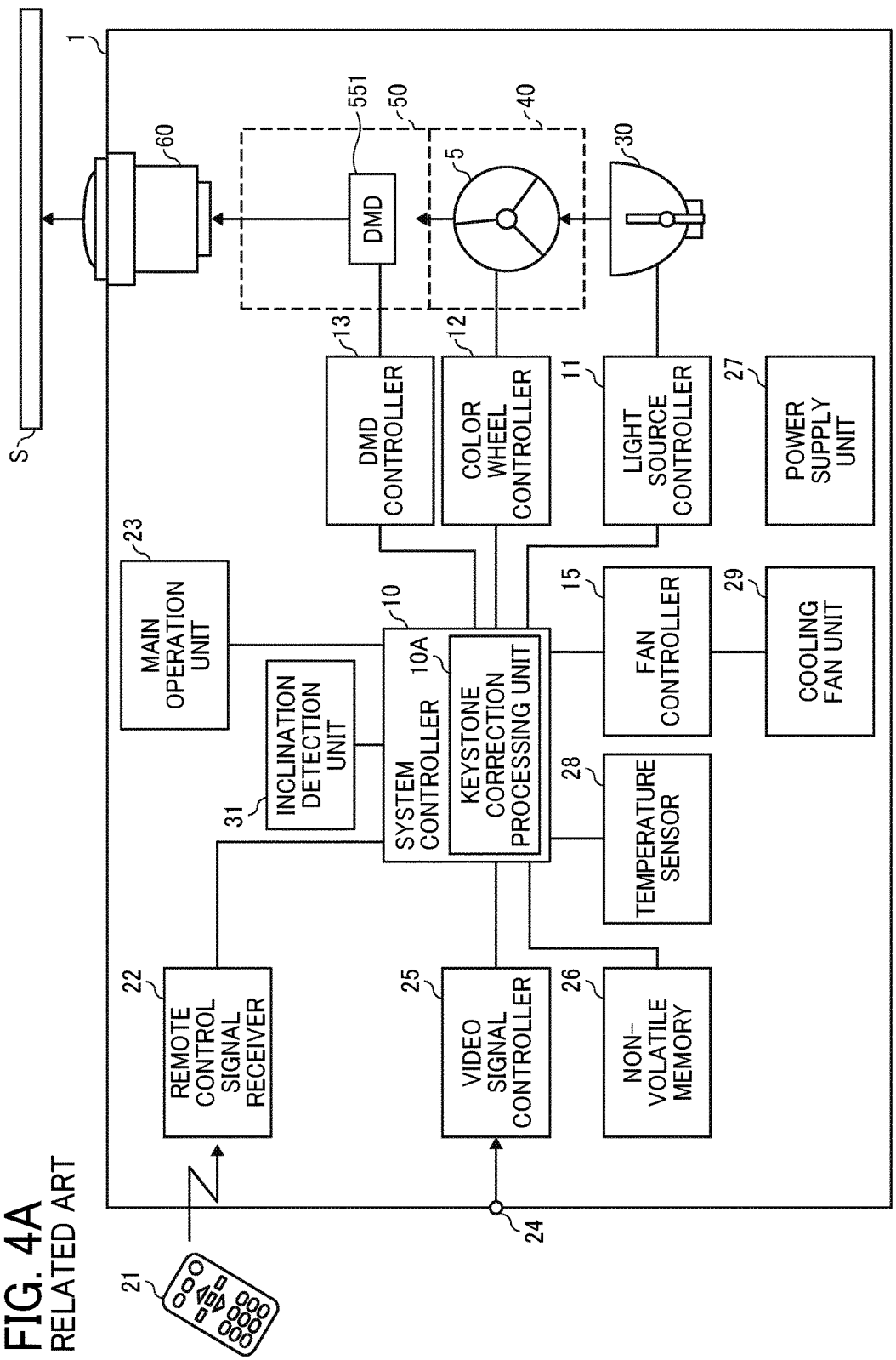
FIG. 4A is an example of a functional block diagram of an image projection apparatus of related art.

FIG. 4A illustrates an example of a functional block diagram of an image projection apparatus 1, which is used as a basic configuration for an image projection apparatus of the embodiments to be described later.

As illustrated in FIG. 4A, the image projection apparatus 1 includes, for example, a system controller 10, a light source controller 11, a color wheel controller 12, a DMD controller 13, a fan controller 15, a remote control signal receiver 22, a main operation unit 23, an input terminal 24, a video signal controller 25, a non-volatile memory 26, a power supply unit 27, a temperature sensor 28, a cooling fan unit 29, the light source 30, an inclination detection unit 31, the light guide unit 40, the image generation unit 50, and the optical projection unit 60 to project an image onto the screen S. The image projection apparatus 1 further includes, for example, a remote controller 21 as a remote control means.

The system controller 10 performs overall control of the image projection apparatus 1. Further, the system controller 10 controls various image processing such as contrast adjustment, brightness adjustment, sharpness adjustment, scaling processing, display processing such as on-screen display (OSD) of menu information, and various other processing.

Further, the system controller 10 performs keystone correction processing or trapezoidal correction processing based on a correction amount that is calculated based on information of an inclination angle detected by the inclination detection unit 31. In this description, an execution unit of the keystone correction processing in the system controller 10 is referred to as a keystone correction processing unit 10A, which is used as a second keystone correction processing unit.

Further, the system controller 10 is connected with the light source controller 11, the color wheel controller 12, the DMD controller 13, the fan controller 15, the remote control signal receiver 22, the main operation unit 23, the video signal controller 25, the non-volatile memory 26, the temperature sensor 28, and the inclination detection unit 31, and controls each of these functional units.

Figure 4B:
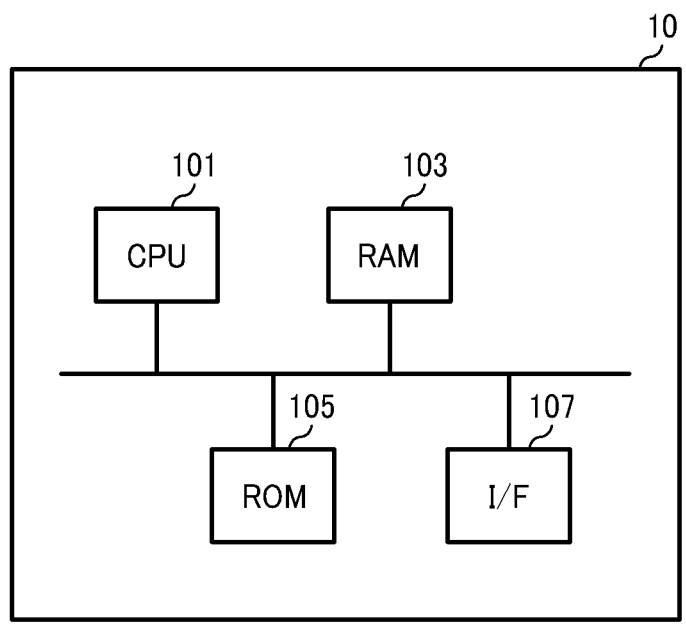
FIG. 4B is an example of a hardware block diagram of a system controller of the image projection apparatus of FIG. 4A.

FIG. 4B is an example of a hardware block diagram of the system controller 10 of the image projection apparatus 1 according to the embodiment. As illustrated in FIG. 5B, the system controller 10 includes, for example, a central processing unit (CPU) 101, a read-only memory (ROM) 105, a random access memory (RAM) 103, and an interface (I/F) 107, and the functions of the units of the system controller 10 are implemented when the CPU 101 executes programs stored in the ROM 105 in cooperation with the RAM 103, but not limited thereto. For example, at least part of the functions of the units of the system controller 10 can be implemented by a dedicated hardware circuit such as a semiconductor integrated circuit. The program executed by the system controller 10 according to the embodiment may be configured to be provided by being recorded in a computer-readable recording medium such as a compact disk read only memory (CD-ROM), a flexible disk (FD), a compact disk recordable (CD-R), a digital versatile disk (DVD), and a universal serial bus (USB) memory as a file of an installable format or an executable format. Alternatively, the program may be configured to be provided or distributed through a network such as the Internet. Moreover, various programs may be configured to be provided by being pre-installed into a non-volatile recording medium such as ROM 105. Further, the hardware block configuration of FIG. 4B can be applied to other controllers.

The input terminal 24 is an interface for inputting a video signal, and includes, for example, Video Graphics Array (VGA) input terminal such as a D-Sub connector, and a video terminal such as High-Definition Multimedia Interface (HDMI) (registered trademark) terminal, S-VIDEO terminal, and RCA terminal. The image projection apparatus 1 receives a video signal from a video supply apparatus such as a computer or an audio visual (AV) device via a cable connected to the input terminal 24. Further, in some cases, the image projection apparatus 1 includes a plurality of input terminals 24. The video signal is an example of image signal.

The video signal controller 25 processes a video signal input to the input terminal 24, and performs various processes such as serial-parallel conversion and voltage level conversion on the video signal. Further, the video signal controller 25 has a signal determination function for analyzing the resolution and frequency of video signals.

The non-volatile memory 26 stores data to be used for the image processing of video signal and various other processing. For example, the non-volatile memory 26 can be a non-volatile semiconductor memory such as an erasable programmable read-only memory (EPROM), an electrically erasable programmable read-only memory (EEPROM), and a flash memory. The image projection apparatus 1 can save or store previously set contents (e.g., language setting) in the non-volatile memory 26 even after the power is turned off.

The main operation unit 23 is an interface used for operating the image projection apparatus 1, and receives various operation requests from a user. Upon receiving an operation request, the main operation unit 23 reports the operation request to the system controller 10. The main operation unit 23 is configured, for example, by operation keys (e.g., operation buttons) provided on an outer surface of the image projection apparatus 1.

The remote control signal receiver 22 receives an operation signal from the remote controller 21. Upon receiving the operation signal from the remote controller 21, the remote control signal receiver 22 reports the operation signal to the system controller 10.

A user can set various settings by operating the main operation unit 23 or the remote controller 21. For example, the user can instruct to display a menu screen, select an installation state of the image projection apparatus 1, a change request of an aspect ratio of the image projection apparatus 1, a power supply ON/OFF request of the image projection apparatus 1, a lamp power change request to change light power of the light source 30, an image mode change to change image quality (e.g., high brightness, standard, natural) of a projected image, and a freeze request to stop the projected image.

The fan controller 15 acquires the internal temperature of the image projection apparatus 1 detected by the temperature sensor 28, and controls the cooling fan unit 29 so that the internal temperature in the image projection apparatus 1 and the temperature of the light source 30 are within a specific temperature range such as a heatproof temperature range.

The power supply unit 27 is connected to each device in the image projection apparatus 1, and converts an alternating current (AC) power, input from an electrical outlet, into a direct current (DC), and supplies the DC to each device in the image projection apparatus 1.

The temperature sensor 28 is provided at a given position in the image projection apparatus 1. The temperature sensor 28 used as a temperature detector for detecting the internal temperature of the image projection apparatus 1, and a detection result (i.e., internal temperature of the image projection apparatus 1) detected by the temperature sensor 28 is transmitted to the system controller 10.

The cooling fan unit 29 can be configured by the intake fan 18, the exhaust fan 19, and the light source cooling fan 20. When air is introduced from the intake fan 18 inside the image projection apparatus 1, and then heated air is exhausted from the exhaust fan 19, the internal space and components of the image projection apparatus 1 can be cooled by a forced air flow. Further, the light source cooling fan 20 is disposed at one side of the light source unit 4 to cool the light source 30. The rotation speed of the light source cooling fan 20 is controlled based on the internal temperature of the image projection apparatus 1. Further, the light source cooling fan 20 and the cooling fan unit 29 can be integrated as one cooling fan unit.

The light source 30 is, for example, a high pressure mercury lamp, which emits light by a discharge between a pair of electrodes, and the light source 30 irradiates light to the light guide unit 40. Further, the light source 30 can use a xenon lamp, and a light emitting diode (LED). Further, the light source controller 11 controls ON/OFF of the light source 30 and the light power of the light source 30.

The inclination detection unit 31 employs, for example, an accelerometer or acceleration sensor that detects the inclination of the image projection apparatus 1. For example, the inclination detection unit 31 detects an inclination angle of the image projection apparatus 1 with respect to a projected image in the vertical direction. The inclination detection of the image projection apparatus 1 in the horizontal direction is to be described later in another embodiment. The information of inclination angle, which is a detection result of the inclination detection unit 31, is stored in, for example, the non-volatile memory 26. Further, the inclination detection unit 31 can include an image capture device such as a camera, with which an image projected onto a projection face is captured by the image capture device, and a correction amount required for performing the keystone correction processing can be calculated from image data of the captured image.

The light emitted from the light source 30 is separated into R (red), G (green), and B (blue) light components time divisionally when the light emitted from the light source 30 passes through the color wheel 5 rotating in one direction in the light guide unit 40, in which each color light exits from the disc-shaped color wheel 5 at each unit time.

The color wheel controller 12 controls the rotation movement of the color wheel 5.

The light exiting from the color wheel 5 is condensed on the DMD 551 used as the image generation element in the image generation unit 50 via the light tunnel 6, the two relay lenses 7, the flat mirror 8, and the concave mirror 9.

The DMD 551 has a substantially rectangular mirror surface configured by the plurality of micromirrors. When each of micromirrors is driven by a time division control based on image data, the light coming from the light guide unit 40 is processed and reflected by the DMD 551 to generate image light. The DMD controller 13 controls on/off switching of the micromirrors of the DMD 551.

The light used for a projection image is reflected to the optical projection unit 60 by the plurality of micromirrors of the DMD 551, and the light to be discarded is reflected to the OFF plate by the DMD 551 based on image data in a time division manner. The image light generated by the image generation unit 50 is reflected to the optical projection unit 60, passes through the optical projection unit 60, and then projected onto the screen S as an enlarged image.

The optical projection unit 60 includes, for example, a plurality of projection lenses and mirrors. The optical projection unit 60 magnifies or enlarges the image generated o formed by the DMD 551 of the image generation unit 50, and projects the magnified or enlarged image on the screen S.

(Functional Structure of Image Projection Apparatus)
(First Embodiment)

Figure 5:
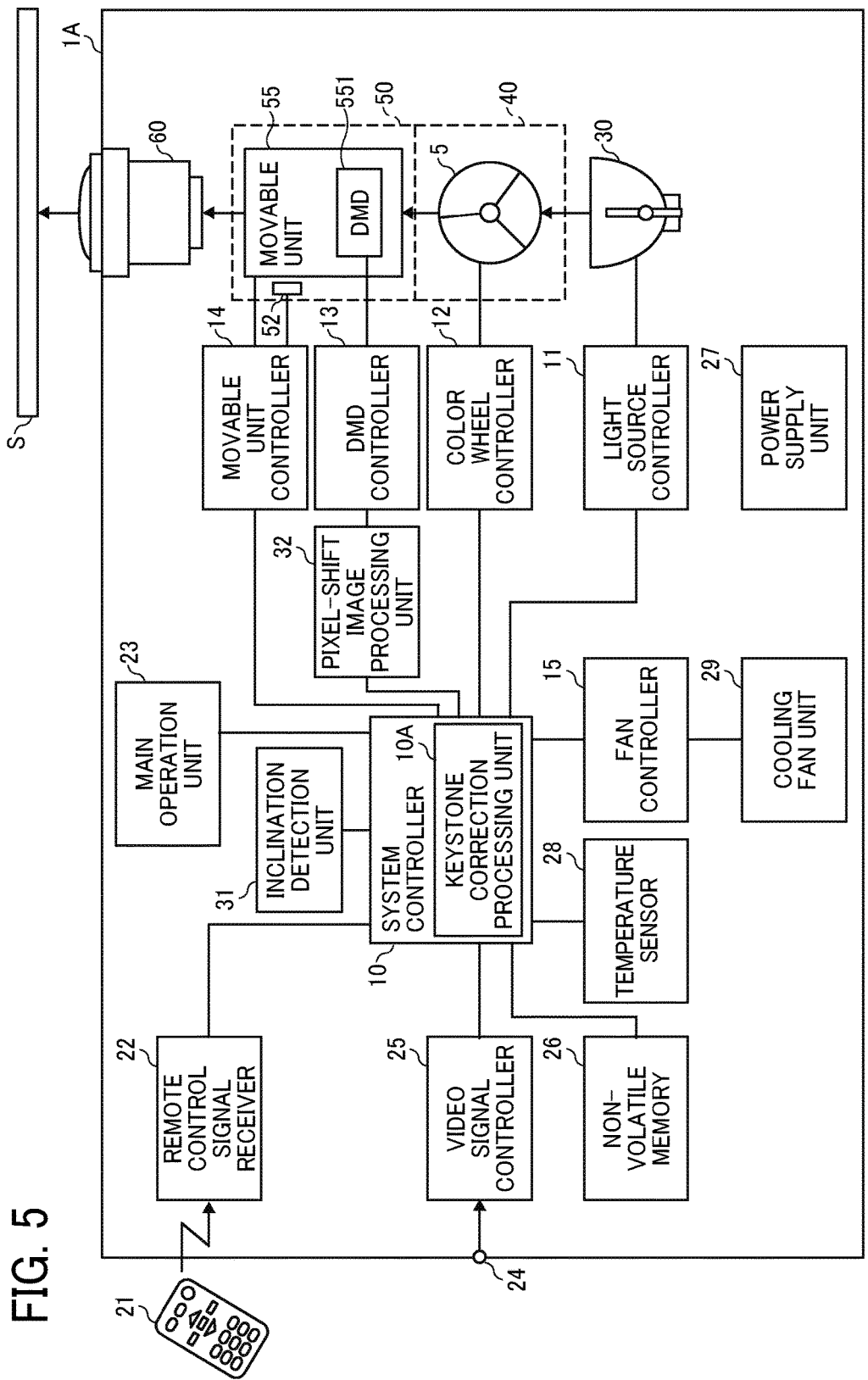
FIG. 5 is an example of a functional block diagram of an image projection apparatus of an embodiment.

FIG. 5 is an example of a functional block diagram of an image projection apparatus 1A of a first embodiment. The image projection apparatus 1A of the first embodiment includes the above described basic configuration. Since the image projection apparatus 1A of the first embodiment includes the above described basic configuration (FIG. 4A), the description of the image projection apparatus 1A of the first embodiment similar to the description of the image projection apparatus 1 illustrated in FIG. 4 is omitted. Hereinafter, a description is given of the image projection apparatus of one or more embodiments, in which the image projection apparatus of one or more embodiments includes the configuration described with reference to FIG. 4A.

The image projection apparatus 1A illustrated in FIG. 5 includes a mechanism and an image processing unit for performing a pixel shift control. Specifically, in addition to the basic configuration illustrated in FIG. 4, the image projection apparatus 1A of the first embodiment includes a movable unit controller 14, a pixel-shift image processing unit 32, a position detector 52, and a movable unit 55 as illustrated in FIG. 5.

The pixel-shift image processing unit 32 is a hardware unit that performs the image processing for generating frames when the pixel shift control is performed. In the embodiments described in this disclosure, the system controller 10 can be configured as one processor or one circuit, and the pixel-shift image processing unit 32 can be configured as another processor or another circuit, in which the system controller 10 is used as a main controller in the image projection apparatus 1A, and the pixel-shift image processing unit 32 is disposed in another controller in the image projection apparatus 1A, which is different from the system controller 10.

Further, the pixel-shift image processing unit 32 performs the keystone correction processing based on a correction amount calculated from the information of the inclination angle detected by the inclination detection unit 31. For example, the pixel-shift image processing unit 32 can be configured, for example, by a programmable logic device (PLD) such as field-programmable gate array (FPGA). The pixel-shift image processing unit 32 and the system controller 10 can be devised as one integrated circuit such as application specific integrated circuit (ASIC) but not limited thereto. The detail of the pixel-shift image processing unit 32 is to be described later.

The image generation unit 50 includes, for example, a fixed unit 51 (FIG. 6) fixed to a frame, and a movable unit 55 movably supported by the fixed unit 51 so that the movable unit 55 can be moved with respect to the fixed unit 51. The movable unit 55 includes, for example, the DMD 551. The position of the movable unit 55 with respect to the fixed unit 51 is controlled by the movable unit controller 14. The movable unit controller 14 is connected to the system controller 10, and is controlled by the system controller 10.

The movable unit 55 includes, for example, an electromagnetic actuator (e.g., voice coil, magnet) as a drive unit. The movable unit controller 14 controls the amount of current to flow to the drive unit of the movable unit 55 to control the shift amount of the DMD 551. The shift control of the DMD 551 by the movable unit controller 14 can be turned on/off by operating the main operation unit 23 or the remote controller 21. When the shift control of the DMD 551 is turned OFF (when the control for reciprocal movement of the DMD 551 is turned OFF), a normal projection image not performing the shifting of DMD 551 is displayed.

Further, the position of the movable unit 55 (i.e., DMD 551) can be detected by the position detector 52 (position sensor) such as a light sensor or a magnetic sensor provided for the image generation unit 50. The movable unit controller 14 determines whether the movable unit 55 is at a target position based on the amount of current (i.e., control parameter) flowed to the drive unit of the movable unit 55 and the detection result (i.e., control result) of the position detector 52, in which the movable unit controller 14 detects whether the movable unit 55 operates normally, and the detection result is input to the system controller 10. With this configuration, the system controller 10 can detect whether the pixel shift control operates normally.

(Image Generation Unit)

Figure 6:
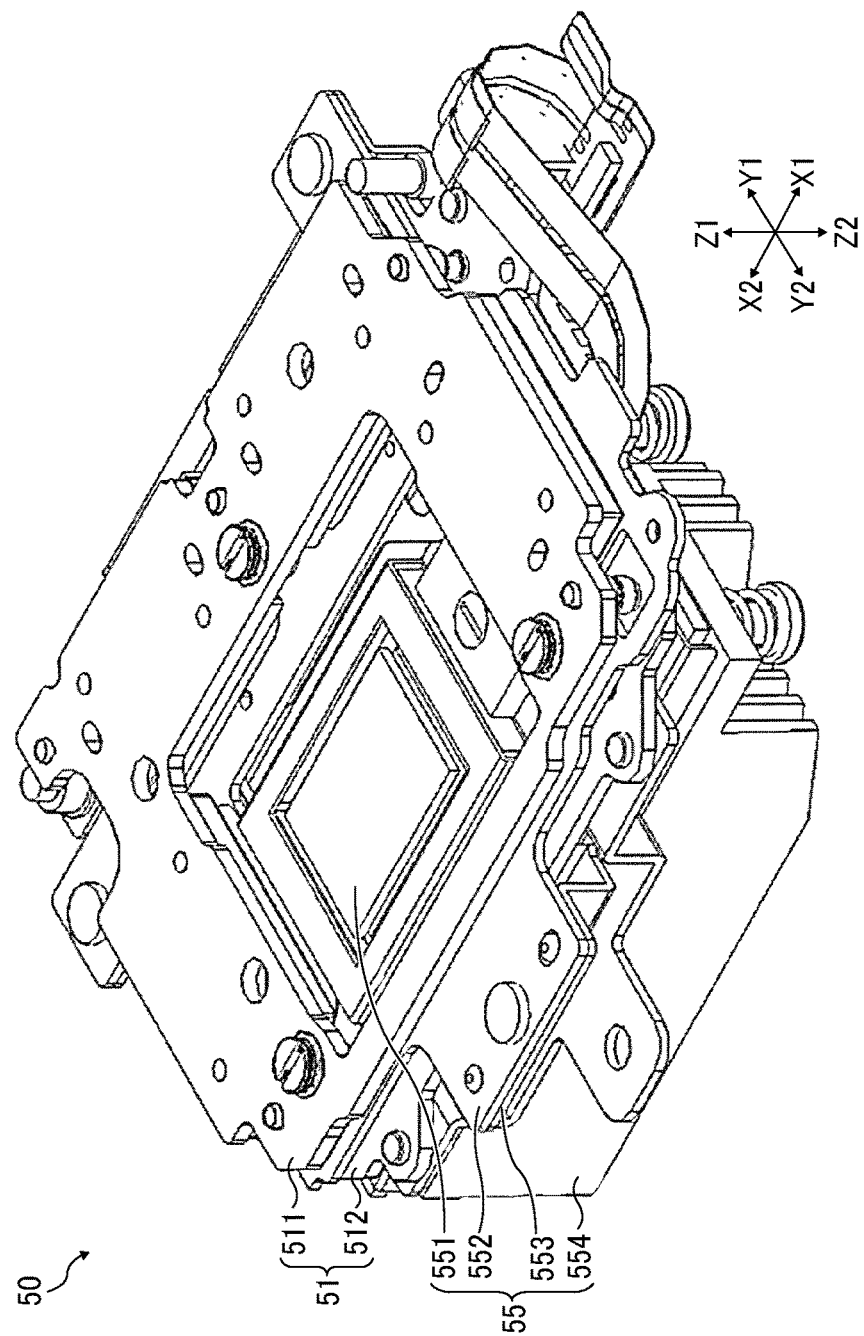
FIG. 6 is a perspective view of an image generation unit.
Figure 7:
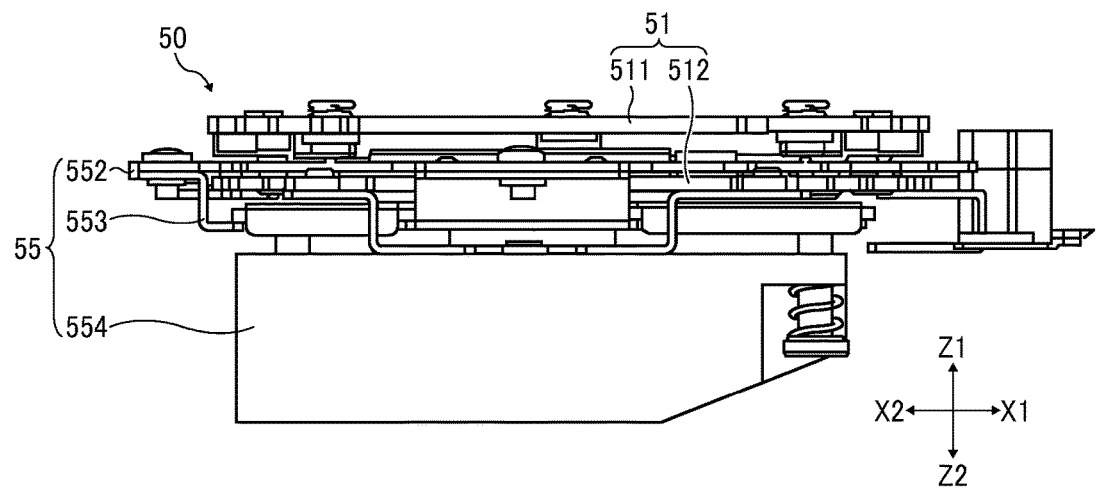
FIG. 7 is a side view of the image generation unit of FIG. 6.

FIG. 6 is a perspective view of the image generation unit 50 according to the embodiment. FIG. 7 is a side view of the image generation unit 50 according to the embodiment.

As illustrated in FIG. 6 and FIG. 7, the image generation unit 50 includes the fixed unit 51, and the movable unit 55. The fixed unit 51 is fixed to a frame of the image projection apparatus 1A while the movable unit 55 is moveably supported by the fixed unit 51. The fixed unit 51 may be also referred to as a non-movable unit.

The fixed unit 51 includes a top plate 511 as a first fixed plate, and a base plate 512 as a second fixed plate. In the fixed unit 51, the top plate 511 and the base plate 512 are provided in parallel to each other with a given space therebetween.

The movable unit 55 includes the DMD 551, a movable plate 552 as a first movable plate, a coupling plate 553 as a second movable plate, and a heat sink 554, and the movable unit 55 is movably supported by the fixed unit 51.

The movable plate 552 is provided between the top plate 511 and the base plate 512 of the fixed unit 51, and is supported by the fixed unit 51 in parallel to the top plate 511 and the base plate 512 and is movably supported by the fixed unit 51 in a direction parallel to the surfaces of the top plate 511 and the base plate 512.

The coupling plate 553 is fixed to the movable plate 552 by interposing the base plate 512 of the fixed unit 51 between the coupling plate 553 and the movable plate 552. As to the coupling plate 553, the DMD 551 is fixed to the upper side of the coupling plate 553, and the heat sink 554 is fixed to the lower side of the coupling plate 553. The coupling plate 553 is fixed to the movable plate 552, and is thereby movably supported by the fixed unit 51 together with the movable plate 552, the DMD 551, and the heat sink 554.

The DMD 551 is provided on a plane of the coupling plate 553 closer to the movable plate 552, and is provided movably together with the movable plate 552 and the coupling plate 553. The DMD 551 includes an image generation plane where a plurality of movable micromirrors are arranged in a lattice pattern. As to each of the micromirrors of the DMD 551, the mirror surface of each of the micromirrors of the DMD 551 is mounted tiltably about a torsion axis, and each of the micromirrors of the DMD 551 is ON/OFF driven based on an image signal transmitted from the DMD controller 13.

For example, in the case of "ON," an inclination angle of the micromirror is controlled so as to reflect the light emitted from the light source 30 to the optical projection unit 60. Further, for example, in the case of "OFF," an inclination angle of the micromirror is controlled in a direction for reflecting the light emitted from the light source 30 toward the OFF plate.

With this configuration, the inclination angle of each of the micromirrors of the DMD 551 is controlled based on the image signal transmitted from the DMD controller 13, and the DMD 551 modulates the light emitted from the light source 30 and passing through the light guide unit 40 to generate a projection image.

The heat sink 554 is an example of a heat radiating unit, and is provided such that at least a part of the heat sink 554 is in contact with the DMD 551. The heat sink 554 is provided for the movably supported coupling plate 553 together with the DMD 551 such that the heat sink 554 is in contact with the DMD 551, with which the DMD 551 can be efficiently cooled. Based on this configuration, in the image projection apparatus of the embodiments, the heat sink 554 suppresses an increase of the temperature of the DMD 551 so that occurrence of troubles such as a malfunction or a failure due to the increase of the temperature of the DMD 551 can be reduced.

(Fixed Unit)

Figure 8:
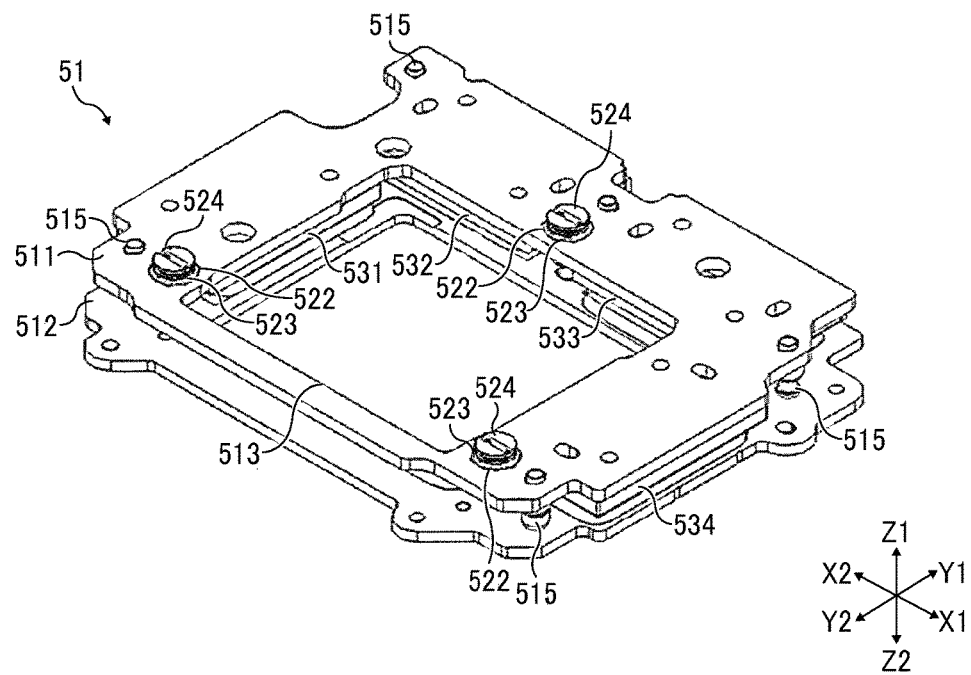
FIG. 8 is a perspective view of a fixed unit.
Figure 9:
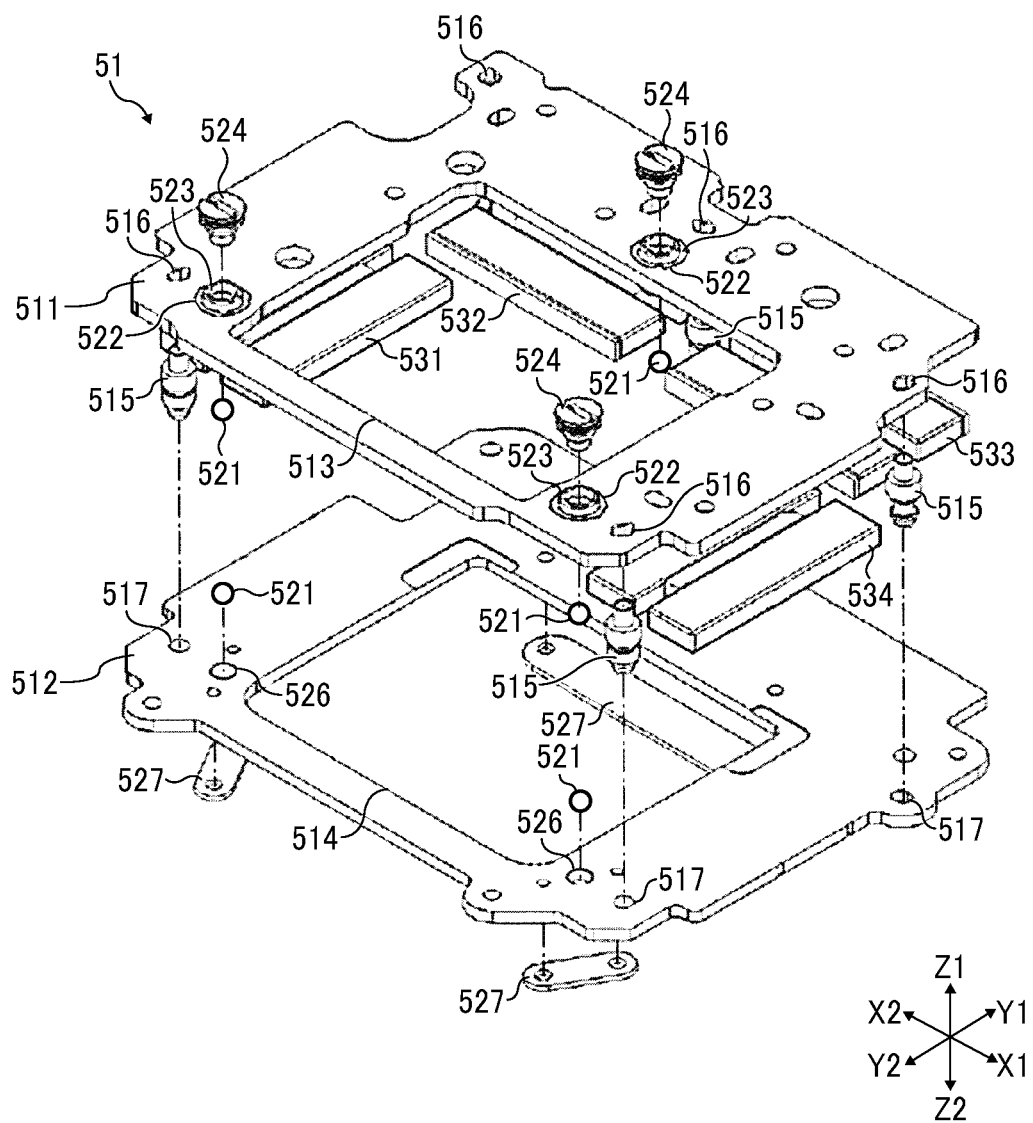
FIG. 9 is an exploded perspective view of the fixed unit of FIG. 8.

FIG. 8 is a perspective view of the fixed unit 51. FIG. 9 is an exploded perspective view of the fixed unit 51.

As illustrated in FIG. 8 and FIG. 9, the fixed unit 51 includes the top plate 511 and the base plate 512.

The top plate 511 and the base plate 512 are each formed from a plate member, and have central holes 513 and 514 respectively provided at positions corresponding to the DMD 551 of the movable unit 55. The top plate 511 and the base plate 512 are provided in parallel to each other by a plurality of supports 515 with a given space therebetween.

As illustrated in FIG. 9, an upper end of the support 515 is pressed into a supporting hole 516 formed in the top plate 511, and a lower end of the support 515 where a male screw groove is formed is inserted into a supporting hole 517 formed in the base plate 512. A plurality of the supports 515 forms a given space between the top plate 511 and the base plate 512 and supports the top plate 511 and the base plate 512 in a parallel manner.

Further, a plurality of supporting holes 522 and 526, each of which rotatably holds a supporting sphere 521, are formed in the top plate 511 and the base plate 512, respectively.

A cylindrical holding member 523 having a female screw groove in its inner periphery is inserted into the supporting hole 522 of the top plate 511. The holding member 523 rotatably holds the supporting sphere 521, and a position adjustment screw 524 is inserted into the holding member 523 from above. The supporting hole 526 of the base plate 512 is covered at its lower end by a lid member 527, and rotatably holds the supporting sphere 521.

The supporting spheres 521 rotatably held by the respective supporting holes 522 and 526 of the top plate 511 and the base plate 512 are in contact with the movable plate 552 provided between the top plate 511 and the base plate 512 to movably support the movable plate 552.

Figure 10:
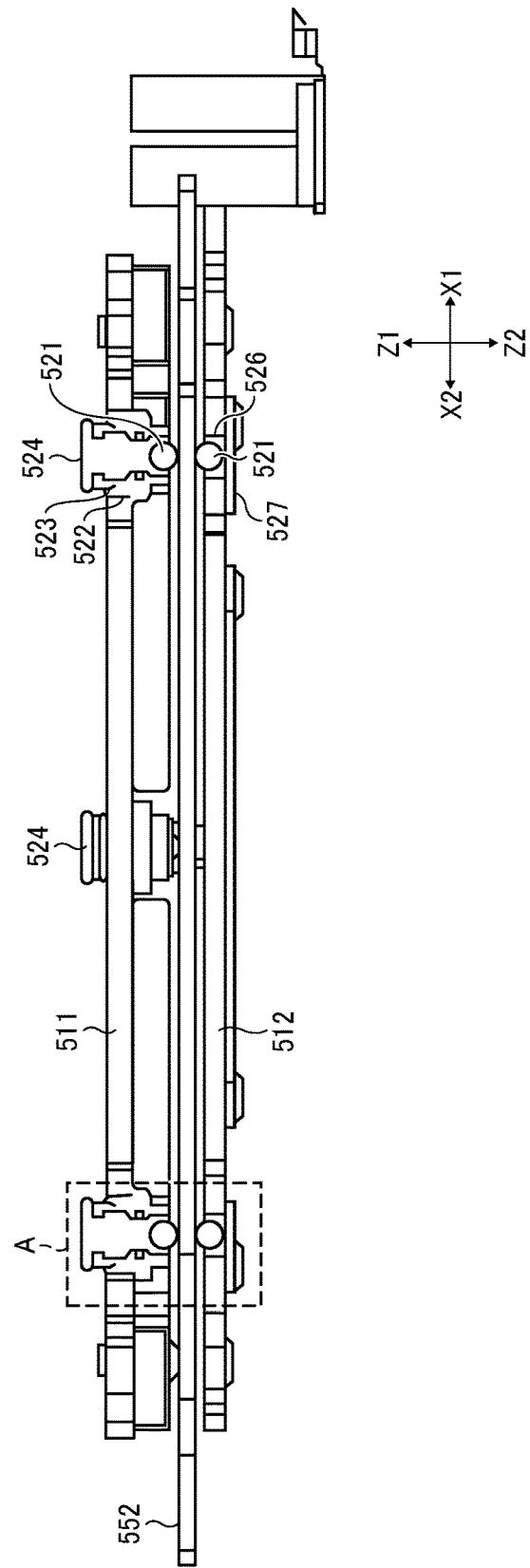
FIG. 10 illustrates a support structure of a movable plate using the fixed unit of FIG. 8.
Figure 11:
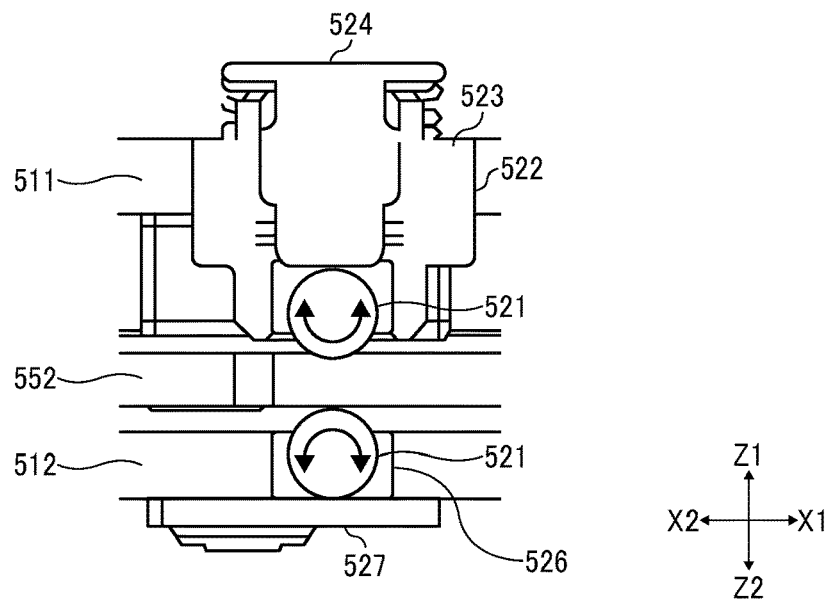
FIG. 11 is a partially enlarged view of the support structure at a portion A in FIG. 10.

FIG. 10 illustrates a support structure of the movable plate 552 using the fixed unit 51. FIG. 11 is a partially enlarged view of the support structure at a portion A in FIG. 10.

As illustrated in FIG. 10 and FIG. 11, in the top plate 511, the supporting sphere 521 is rotatably held by the holding member 523 inserted into the supporting hole 522. In the base plate 512, the supporting sphere 521 is rotatably held by the supporting hole 526 whose lower end is covered by the lid member 527.

The supporting spheres 521 are held such that at least a part thereof protrudes from the supporting holes 522 and 526, and are in contact with and supporting the movable plate 552 provided between the top plate 511 and the base plate 512. The movable plate 552 is supported by the rotatably provided supporting spheres 521 from both sides of the movable plate 552 so as to be supported in parallel to the top plate 511 and the base plate 512 and movably in a direction parallel to the surfaces of the top plate 511 and the base plate 512.

Further, as to the supporting sphere 521 provided on the top plate 511, an amount of protrusion of the supporting sphere 521 from the lower end of the holding member 523 is changed by adjusting the position of the position adjustment screw 524 that contacts with the supporting sphere 521 at one side of the supporting sphere 521 that is farther from the movable plate 552. For example, when the position adjustment screw 524 is displaced in the Z1 direction, the amount of protrusion of the supporting sphere 521 decreases, with which a space between the top plate 511 and the movable plate 552 is reduced. Further, for example, when the position adjustment screw 524 is displaced in the Z2 direction, the amount of protrusion of the supporting sphere 521 increases, with which a space between the top plate 511 and the movable plate 552 is increased.

With this configuration, by changing the amount of protrusion of the supporting sphere 521 using the position adjustment screw 524, the space between the top plate 511 and the movable plate 552 can be appropriately adjusted.

Further, as illustrated in FIG. 8 and FIG. 9, magnets 531, 532, 533, and 534 are provided on the plane of the top plate 511 closer to the base plate 512.

Figure 12:
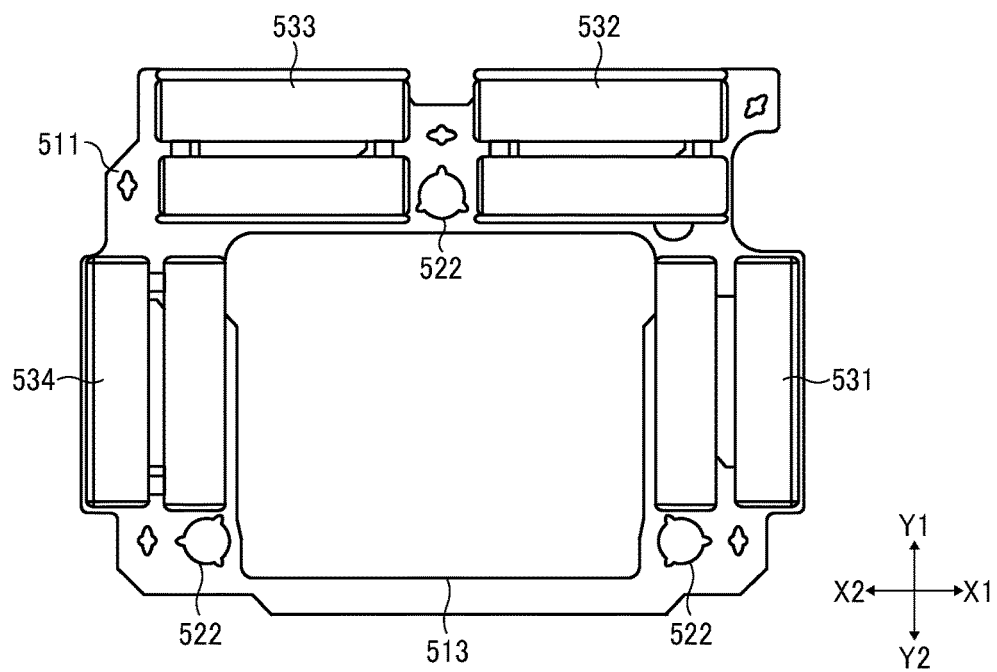
FIG. 12 is a bottom view of a top plate.

FIG. 12 is a bottom view of the top plate 511 according to the embodiment. As illustrated in FIG. 12, the magnets 531, 532, 533, and 534 are provided on the plane of the top plate 511 closer to the base plate 512.

The magnets 531, 532, 533, and 534 are arranged at four locations so as to surround the central hole 513 of the top plate 511. Each of the magnets 531, 532, 533, and 534 is configured with two cuboid magnets arranged such that their longitudinal directions are parallel to each other, and the two cuboid magnets form a magnetic field effecting the movable plate 552.

The magnets 531, 532, 533, and 534 configure a movement unit for moving the movable plate 552 in cooperation with coils that are provided on the upper surface of the movable plate 552 while each of the coils facing the magnets 531, 532, 533, and 534.

Further, the number, the locations, and the like of the supports 515 and the supporting spheres 521 provided in the fixed unit 51 are not limited to the configuration illustrated in the embodiment as long as they are capable of movably supporting the movable plate 552.

(Movable Unit)

Figure 13:
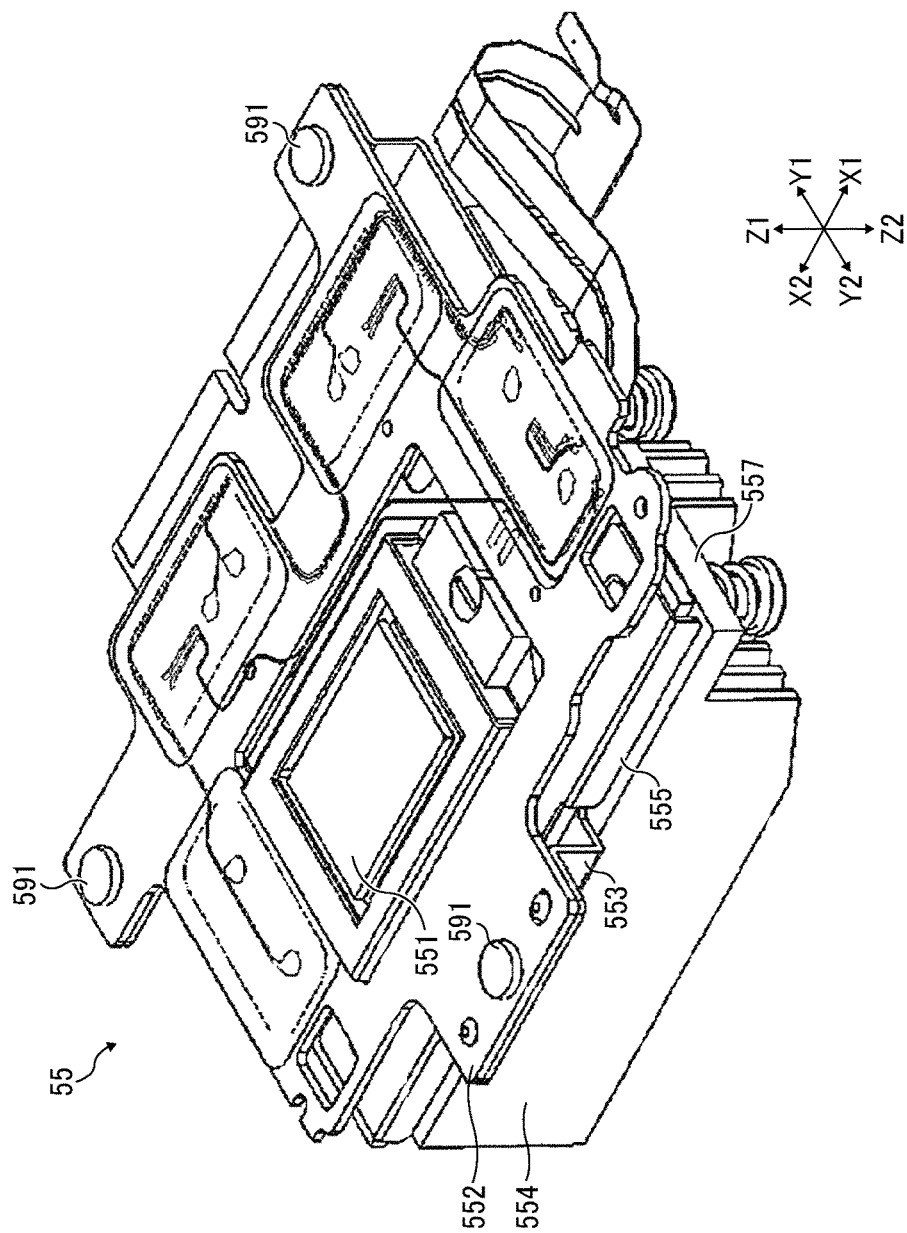
FIG. 13 is a perspective view of a movable unit.
Figure 14:
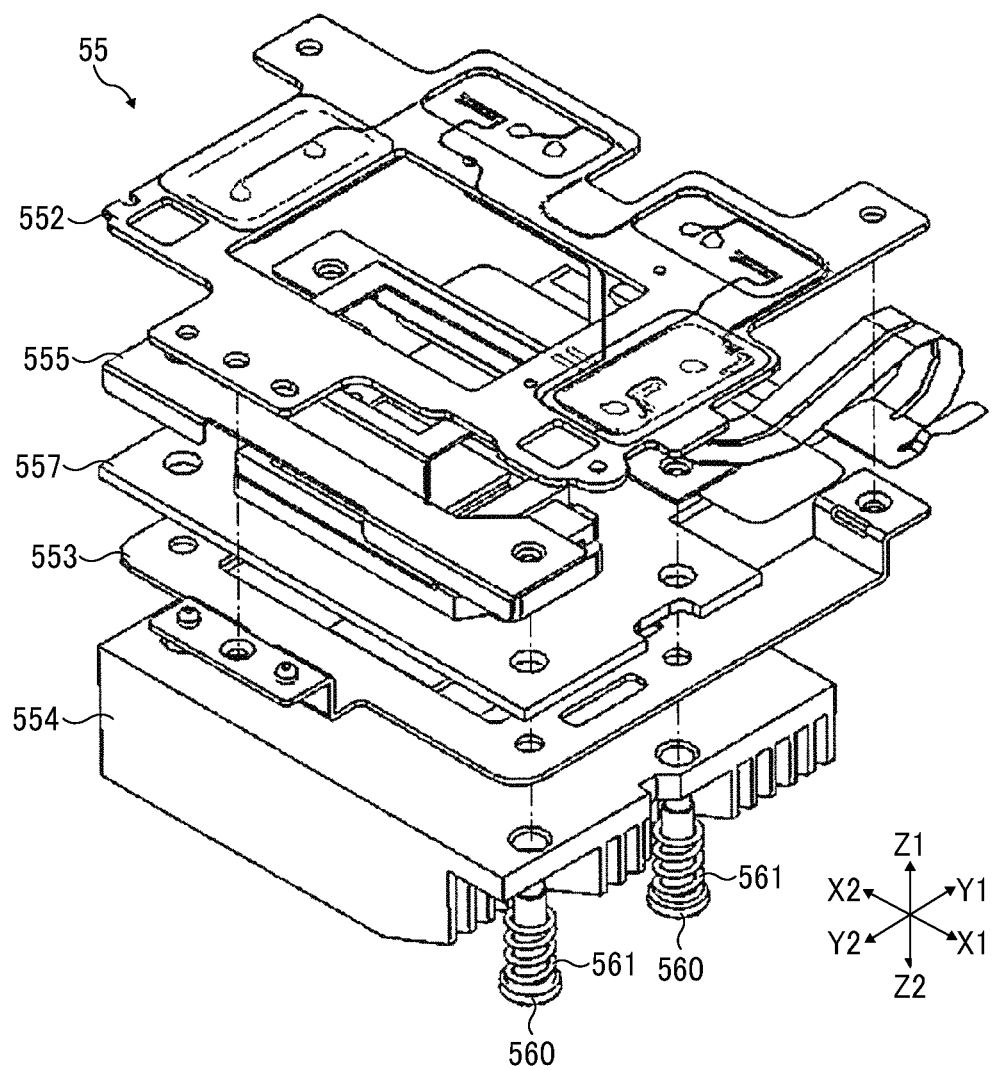
FIG. 14 is an exploded perspective view of the movable unit of FIG. 13.

FIG. 13 is a perspective view of the movable unit 55. FIG. 14 is an exploded perspective view of the movable unit 55.

As illustrated in FIG. 13 and FIG. 14, the movable unit 55 includes the DMD 551, the movable plate 552, the coupling plate 553, the heat sink 554, a holding member 555, and a DMD substrate 557, and is movably supported by the fixed unit 51.

As described above, the movable plate 552 is provided between the top plate 511 and the base plate 512 of the fixed unit 51, and is supported movably in a direction parallel to the surfaces of the top plate 511 and the base plate 512 by the supporting spheres 521.

Figure 15:
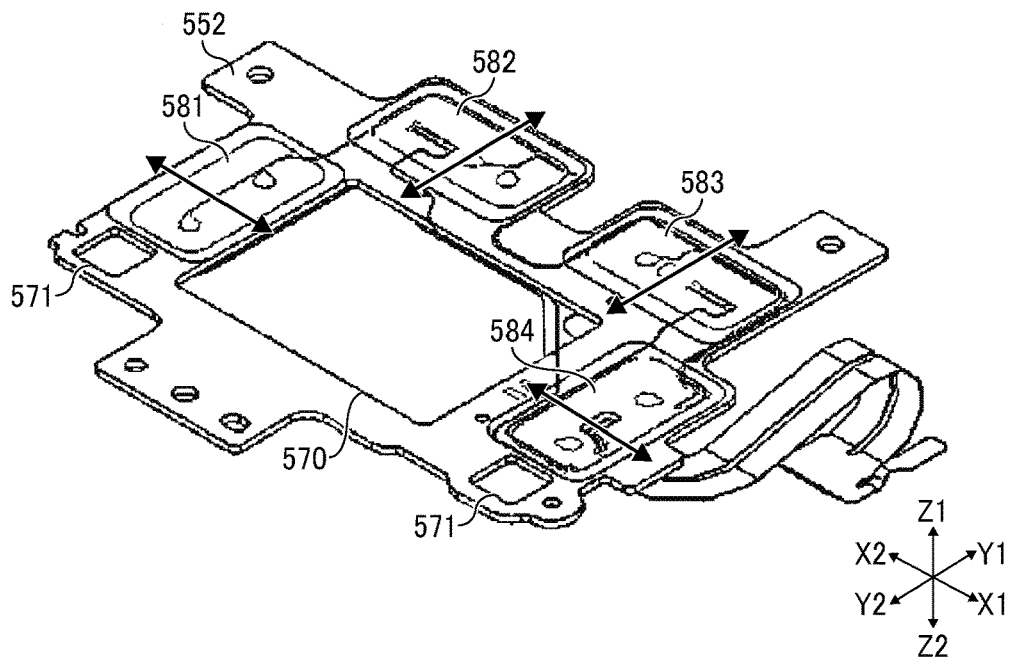
FIG. 15 is a perspective view of a movable plate.

FIG. 15 is a perspective view of the movable plate 552 of the embodiment.

As illustrated in FIG. 15, the movable plate 552 is formed from a plate member, has a central hole 570 made at a position corresponding to the DMD 551 provided in the DMD substrate 557, and also has coils 581, 582, 583, and 584 provided around the central hole 570.

Each of the coils 581, 582, 583, and 584 is formed by an electric wire being wound around an axis parallel to the Z1-Z2 direction, is provided in a recess formed on the side of the movable plate 552 closer to the top plate 511, and is covered with a cover. The coils 581, 582, 583, and 584 configure the movement unit for moving the movable plate 552 in cooperation with the respective magnets 531, 532, 533, and 534 of the top plate 511.

The magnets 531, 532, 533, and 534 of the top plate 511 and the coils 581, 582, 583, and 584 of the movable plate 552 are provided in locations so as to face each other, respectively, in the state that the movable unit 55 is supported by the fixed unit 51. When a current is made to flow in the coils 581, 582, 583, and 584, a Lorentz force used as a drive force for moving the movable plate 552 is generated by the magnetic field formed by the magnets 531, 532, 533, and 534.

When the movable plate 552 receives the Lorentz force as the drive force generated between the magnets 531, 532, 533, and 534 and the coils 581, 582, 583, and 584, the movable plate 552 is linearly or rotationally displaced on the X-Y plane with respect to the fixed unit 51.

The magnitude and direction of the current flowing in each of the coils 581, 582, 583, and 584 is controlled by the movable unit controller 14. The movable unit controller 14 controls a movement direction (linear or rotation direction), a movement amount, and a rotation angle of the movable plate 552 by controlling the magnitude and direction of the current flowing in each of the coils 581, 582, 583, and 584.

In the embodiment, the coil 581 and the magnet 531 facing each other and the coil 584 and the magnet 534 facing each other disposed at the opposite positions in the X1-X2 direction configure a first drive unit. When a current is made to flow in the coil 581 and the coil 584, the Lorentz force is generated in the X1 direction or in the X2 direction as illustrated in FIG. 15. The movable plate 552 is moved in the X1 direction or in the X2 direction by the Lorentz forces generated between the coil 581 and the magnet 531 and between the coil 584 and the magnet 534.

Further, in the embodiment, the coil 582 and the magnet 532 facing each other and the coil 583 and the magnet 533 facing each other disposed in parallel in the X1-X2 direction configure a second drive unit. Further, the magnet 532 and the magnet 533 are arranged such that the longitudinal directions of the magnet 532 and the magnet 533 are perpendicular to the longitudinal directions of the magnet 531 and the magnet 534. Based on this configuration, when a current is made to flow in the coil 582 and the coil 583, the Lorentz force is generated in the Y1 direction or in the Y2 direction as illustrated in FIG. 15.

The movable plate 552 is moved in the Y1 direction or in the Y2 direction by the Lorentz forces generated between the coil 582 and the magnet 532 and between the coil 583 and the magnet 533. Further, the movable plate 552 is displaced to rotate on the X-Y plane by a Lorentz force generated between the coil 582 and the magnet 532 and a Lorentz force generated between the coil 583 and the magnet 533, which are generated in the opposite directions.

For example, when a current is made to flow such that a Lorentz force is generated in the Y1 direction by the coil 582 and the magnet 532 and a Lorentz force is generated in the Y2 direction by the coil 583 and the magnet 533, the movable plate 552 is displaced to rotate clockwise when viewed from the top. Further, when a current is made to flow such that a Lorentz force is generated in the Y2 direction by the coil 582 and the magnet 532 and a Lorentz force is generated in the Y1 direction by the coil 583 and the magnet 533, the movable plate 552 is displaced to rotate counterclockwise when viewed from the top.

Further, a movable range restriction hole 571 is provided in the movable plate 552 at a position corresponding to the support 515 of the fixed unit 51. The support 515 of the fixed unit 51 is inserted in the movable range restriction hole 571, and the movable range restriction hole 571 restricts a movable range of the movable plate 552 by coming in contact with the support 515 when the movable plate 552 is largely moved due to, for example, vibration or some abnormality.

As described above, in the embodiment, the movable unit controller 14 controls the magnitude or the direction of the current to be made to flow in the coils 581, 582, 583, and 584, with which the movable plate 552 can be moved to any positions within the movable range.

Further, the number, the location, and the like of the magnets 531, 532, 533, and 534 and the coils 581, 582, 583, and 584, which function as the movement unit, may be configured in a different manner from that of the embodiment as long as the movable plate 552 can be moved to any positions. For example, the magnets used as the movement unit may be provided on the upper surface of the top plate 511 or may be provided on any plane of the base plate 512. Further, for example, a configuration in which the magnets are provided on the movable plate 552 and the coils are provided on the top plate 511 or the base plate 512, may be employed.

Further, the number, the locations, the shape, and the like of the movable range restriction hole 571 are not limited to the configuration illustrated in the embodiment. For example, the number of movable range restriction holes 571 may be one or plural. Further, the shape of the movable range restriction hole 571 may be different from that of the embodiment, and may be a rectangle or a circle.

As illustrated in FIG. 13, the coupling plate 553 is fixed to the lower side (the side closer to the base plate 512) of the movable plate 552 movably supported by the fixed unit 51. The coupling plate 553 is formed from a plate member, has a central hole made at a position corresponding to the DMD 551, and has bent portions provided at periphery of the coupling plate 553 that are fixed to the lower side of the movable plate 552 by using three screws 591.

Figure 16:
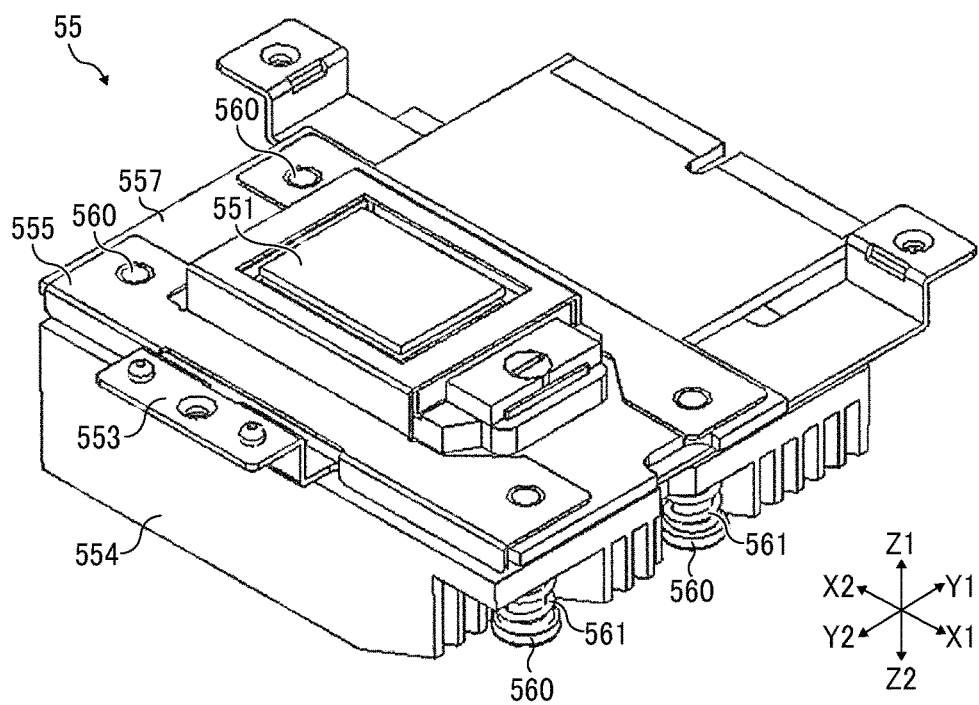
FIG. 16 is a perspective view of the movable unit of FIG. 13 from which the movable plate is removed.

FIG. 16 is a perspective view of the movable unit 55 from which the movable plate 552 is removed.

As illustrated in FIG. 16, the coupling plate 553 has the DMD 551 provided on its upper surface and the heat sink 554 provided on its lower surface. Since the coupling plate 553 is fixed to the movable plate 552, the coupling plate 553 having the DMD 551 and the heat sink 554 is provided movably with respect to the fixed unit 51 as the movable plate 552 is provided movably with respect to the fixed unit 51.

The DMD 551 is provided on the DMD substrate 557, and the DMD substrate 557 is sandwiched between the holding member 555 and the coupling plate 553, with which the DMD 551 is fixed to the coupling plate 553. As illustrated in FIG. 14 and FIG. 16, the holding member 555, the DMD substrate 557, the coupling plate 553, and the heat sink 554 are overlapped and fixed using stepped screws 560 as fixing units and springs 561 as pressing units.

Figure 17:
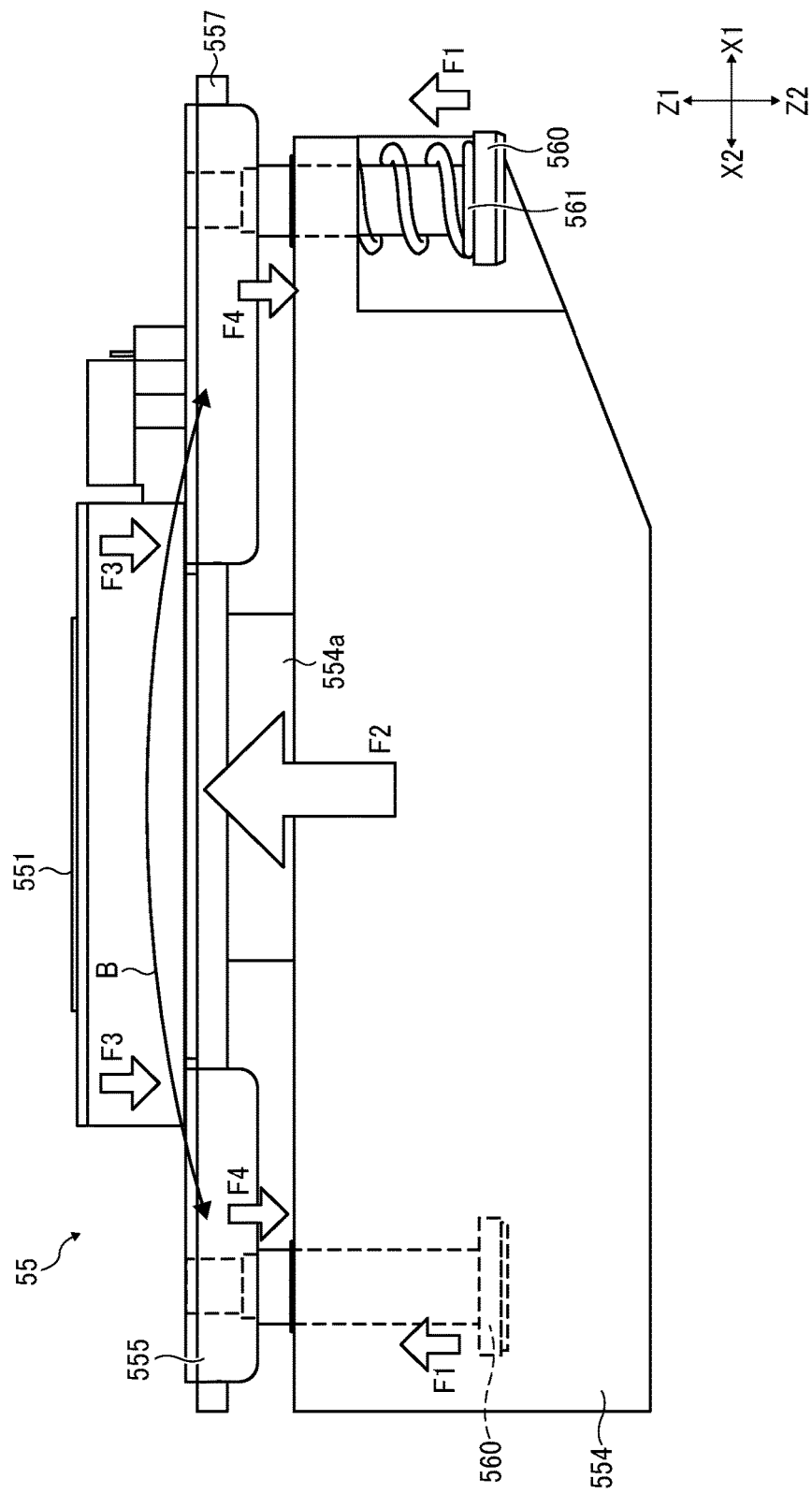
FIG. 17 illustrates a DMD holding structure of the movable unit of FIG. 13.

FIG. 17 illustrates a DMD holding structure of the movable unit 55. FIG. 17 is a side view of the movable unit 55, in which the movable plate 552 and the coupling plate 553 are omitted.

As illustrated in FIG. 17, the heat sink 554 has a projecting portion 554a in contact with the lower side of the DMD 551 through a through hole provided in the DMD substrate 557 in the state that the heat sink 554 is fixed to the coupling plate 553. Further, the projecting portion 554a of the heat sink 554 may be provided such that it is in contact with a position of the lower side of the DMD substrate 557 corresponding to the DMD 551.

Further, to enhance a cooling effect of the DMD 551, an elastically deformable heat transfer sheet may be provided between the projecting portion 554a of the heat sink 554 and the DMD 551. By providing the elastically deformable heat transfer sheet between the projecting portion 554a of the heat sink 554 and the DMD 551, a thermal conductivity between the projecting portion 554a of the heat sink 554 and the DMD 551 is enhanced, and the cooling effect of the DMD 551 by the heat sink 554 is enhanced.

As described above, the holding member 555, the DMD substrate 557, and the heat sink 554 are overlapped and fixed using the stepped screws 560 and the springs 561. When the stepped screws 560 are tightened, the springs 561 are compressed in the Z1-Z2 direction, and a force F1 in the Z1 direction illustrated in FIG. 17 is generated from the spring 561. The heat sink 554 is pressed against the DMD 551 by a force F2 in the Z1 direction due to forces F1 generated from the springs 561.

In the embodiment, the stepped screws 560 and the springs 561 are provided at four locations, and the force F2 applied to the heat sink 554 is equal to that obtained by combining the forces F1 generated in the four springs 561. Further, the force F2 from the heat sink 554 acts on the holding member 555 that holds the DMD substrate 557 where the DMD 551 is provided. Consequently, a force F3 in the Z2 direction corresponding to the force F2 from the heat sink 554 is generated in the holding member 555, so that the DMD substrate 557 can be held between the holding member 555 and the coupling plate 553.

A force F4 in the Z2 direction acts on the stepped screw 560 and the spring 561 from the force F3 generated in the holding member 555. Since the springs 561 are provided at the four locations, the force F4 acting on each of the springs 561 is equivalent to a quarter of the force F3 generated in the holding member 555, and is resultantly balanced with the force F1.

Further, the holding member 555 is a member capable of bending or warping as illustrated by arrow B in FIG. 17, and is formed as a plate spring. The holding member 555 is bent or warped by being pressed by the projecting portion 554a of the heat sink 554 and a force to push back the heat sink 554 in the Z2 direction is generated, with which it is possible to firmly keep the contact between the DMD 551 and the heat sink 554.

As described above, as to the movable unit 55, the movable plate 552 and the coupling plate 553 that includes the DMD 551 and the heat sink 554 are movably supported by the fixed unit 51. The position of the movable unit 55 is controlled by the movable unit controller 14. Further, the heat sink 554 in contact with the DMD 551 is provided in the movable unit 55, so that occurrence of troubles such as a malfunction and a failure caused by an increase of the temperature of the DMD 551 can be suppressed, in particular prevented.

(Shifting of Pixel)

As described above, in the image projection apparatus 1A of the first embodiment, the DMD 551 that generates or forms a projection image is provided in the movable unit 55, and the position of the DMD 551 is controlled by the movable unit controller 14 together with the movable unit 55.

For example, the movable unit controller 14 controls the position of the movable unit 55 so as to move the movable unit 55 with a higher speed between a plurality of positions, which are apart from each other by a distance that is less than an arrangement interval of the micromirrors of the DMD 551 with a given cycle corresponding to a frame rate at the time of projecting images. When the movable unit 55 is moved (i.e., when the position of the DMD 551 is shifted), the pixel-shift image processing unit 32 generates a projection image based on the plurality of shifted positions of the DMD 551, and transmits image signals of the projection images to the DMD 551 via the DMD controller 13.

For example, the movable unit controller 14 reciprocally moves the DMD 551 with the given cycle between a position PA and a position PB, which are apart from each other by a distance that is less than the arrangement interval of the micromirrors of the DMD 551 in the X1-X2 direction and in the Y1-Y2 direction. At this timing, the DMD controller 13 controls the DMD 551 so as to generate the position-shifted projection images based on the plurality of shifted positions of the DMD 551 so that a resolution of the projection image can be made about twice the resolution of the DMD 551.

With this configuration, the movable unit controller 14 moves the DMD 551 together with the movable unit 55 with the given cycle, and the pixel-shift image processing unit 32 and the DMD controller 13 generate the projection image based on the plurality of positions of the DMD 551, with which the image having a resolution higher than a resolution of the DMD 551 can be projected.

Figure 18A:
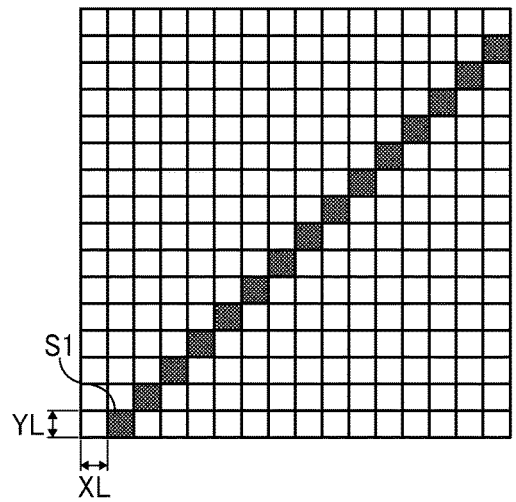
FIGS. 18A, 18B, and 18C illustrate an example of a display state of an image when pixels are shifted by performing a pixel-shift control.
Figure 18B:
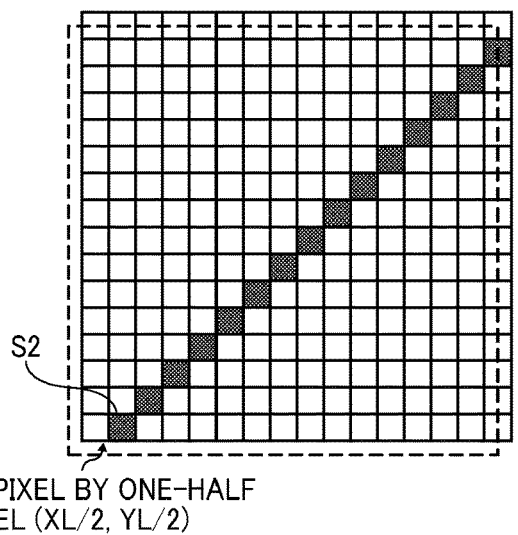
Figure 18C:
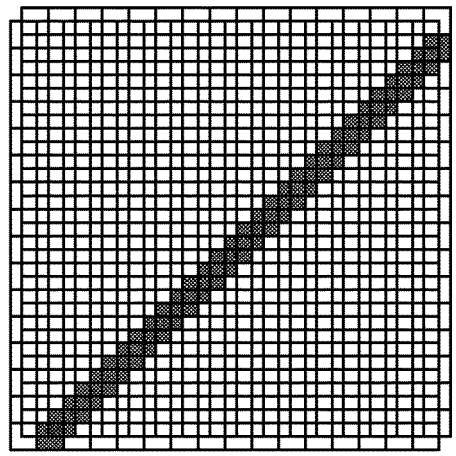

FIG. 18A, FIG. 18B, and FIG. 18C illustrate an example of a display state of an image when pixels are shifted by one-half pixel by performing the pixel-shift control operation or DMD-shift control operation.

FIG. 18A illustrates each pixel S1 in a state when the display position is not shifted (i.e., state before shifting, first position), and the size of each pixel is XL×YL. FIG. 18B illustrates each pixel S2 in a state (i.e., second position) shifted by one-half pixel (XL/2, YL/2) from the state (i.e., first position) of FIG. 18A. An operation mode that shifts pixels between two states in an oblique direction is referred to as a two-way shift operation. In this example case, the shift amount is set to one-half pixel, but the shift amount is not limited to one-half pixel.

Then, by combining the two images (FIGS. 18A and 18B), that is, alternately projecting each images at each pixel, the pseudo high resolution can be achieved as illustrated in FIG. 18C.

(Pixel-shift Image Processing Unit)

When the pixel-shift control is performed, the movable unit controller 14 controls the movable unit 55 to shift the DMD 551 in the oblique direction, and a first frame and a second frame are projected with a state of shifting pixels for one-half pixel to achieve a higher resolution image as illustrated in FIG. 18C. In the embodiment, the pixel-shift image processing unit 32 performs image processing to generate two images (two frames) such as one frame at a first position (first frame) and another frame at a second position (second frame) for one image signal (one frame), input to the pixel-shift image processing unit 32, and this image processing is referred to as the image processing for the pixel shift control.

As to the pixel shift control, the control of the movable unit 55 by the movable unit controller 14 and the image generation by the pixel-shift image processing unit 32 are synchronized to achieve a higher resolution. For example, when one UHD image having image resolution of (4K, 3840×2160) is input, two FHD images having image resolution of (2K, 1920×1080) are generated and then the two images are alternately switched and displayed by synchronizing the display switching timing and the shift timing of the pixels with each other to achieve the higher resolution.

Conventionally, the keystone correction processing is performed for an image signal such as an original image input to an image projection apparatus such that the image projection apparatus can generate an image with the smallest image deterioration. Therefore, as to conventional image projection apparatuses that perform the pixel shift control, the keystone correction processing unit 10A of the system controller 10 disposed in a conventionally image forming apparatus performs the keystone correction processing to an image before performing the image processing for the pixel shift control, and then generates two images for the pixel shift control from the image applied with the keystone correction processing.

However, the inventor of the present invention has found that deterioration of image quality becomes greater, and visibility is reduced when the image processing for the pixel shift control is performed to the image already applied with the keystone correction processing. This phenomenon may occur because a shape of the image applied with the keystone correction processing is changed from a shape of the original image that is the shape of the original image before the keystone correction processing is performed. By further performing the image processing for the pixel shift control to the image already applied with the keystone correction processing, the deterioration of the image quality may become greater. Further, when two images are generated from one image in the image processing for the pixel shift control, correction processing may be performed if required. For example, an image is divided and analyzed, and then the correction processing is performed for the divided images based on characteristic of the image. If the correction processing is performed in the image processing for the pixel shift control in addition to generating the two images, the image quality deteriorates when the keystone correction processing is performed.

Therefore, the image projection apparatus 1A of the first embodiment includes, for example, the image generation element such as the DMD 551 that generates or forms an image using light emitted from the light source such as the light source 30, a shift unit such as the movable unit 55 that shifts a position of the image generation element, in which images can be projected while reciprocally moving or shifting the image generation element by the shift unit in the pixel shift mode, in which an image generation processing unit such as an image generation processing unit 33 generates images for the pixel shift mode based on the input image, and a keystone correction processing unit such as a keystone correction processing unit 34 performs the keystone correction processing to the images generated by the image generation processing unit.

Conventionally, the keystone correction processing is performed by the system controller 10 used as the main controller such as a main processor chip. In the first embodiment, the pixel-shift image processing unit 32 is disposed as another processor chip at a subsequent stage of the system controller 10 independently from the system controller 10. The pixel-shift image processing unit 32 includes, for example, the image generation processing unit 33, and the keystone correction processing unit 34 at a subsequent stage of the image generation processing unit 33. The image generation processing unit 33 generates images used for the pixel shift control, and the keystone correction processing unit 34 performs the keystone correction processing.

Figure 19A:
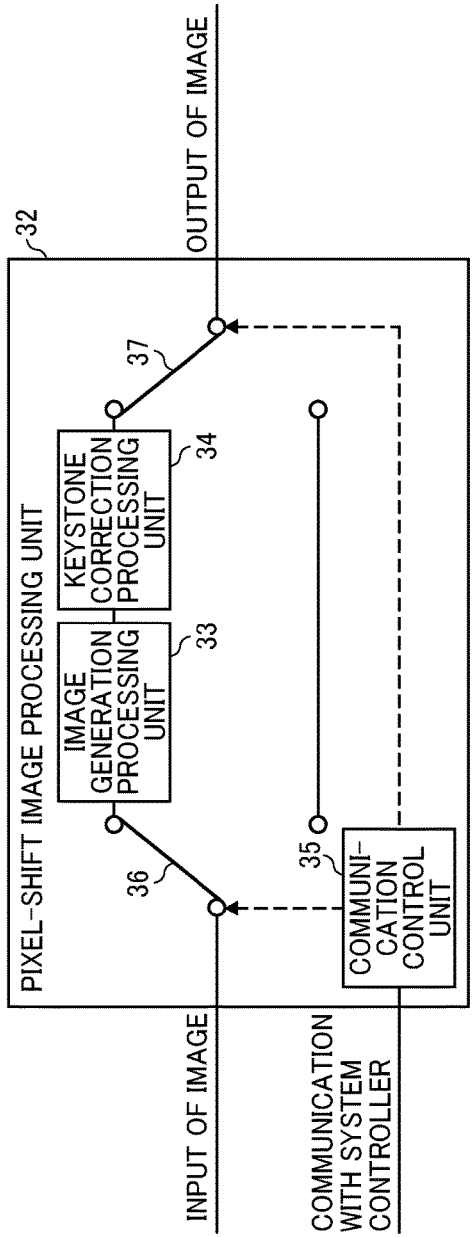
FIGS. 19A and 19B illustrate an example of a functional block diagram of a pixel-shift image processing unit.
Figure 19B:
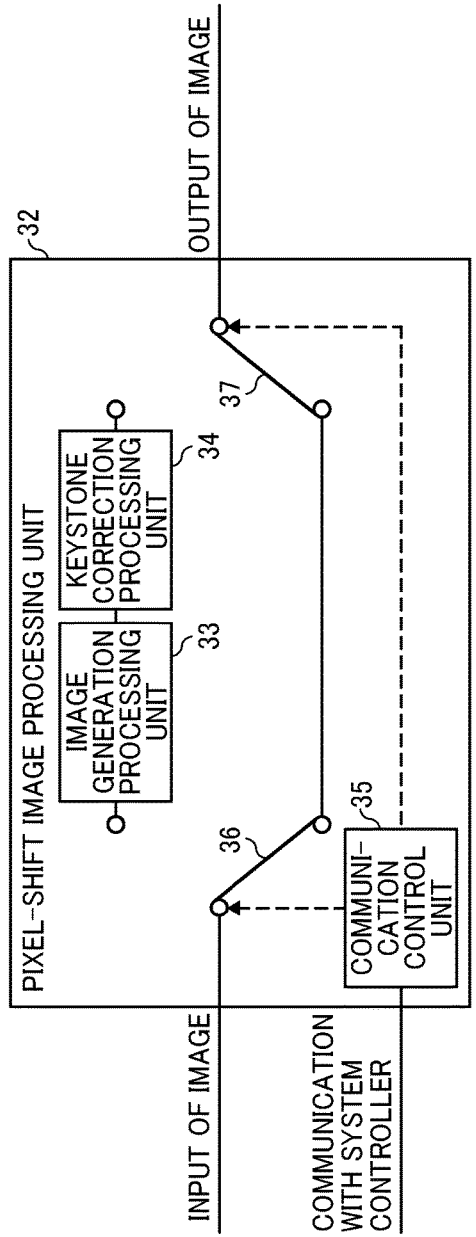

FIG. 19 illustrates an example of a functional block diagram of the pixel-shift image processing unit 32. The pixel-shift image processing unit 32 includes, for example, the image generation processing unit 33, the keystone correction processing unit 34, a communication control unit 35, and switches 36 and 37. FIG. 19A illustrates one case when the pixel shift control is turned ON, and FIG. 19B illustrates another case when the pixel shift control is turned OFF.

The image generation processing unit 33 performs the image processing that generates two images from one image. Further, the image generation processing unit 33 can be configured to perform the correction processing if necessary.

The keystone correction processing unit 34, used as a first keystone correction processing unit, performs the keystone correction processing based on a correction amount calculated from information of the inclination angle detected by the inclination detection unit 31. The keystone correction processing unit 34 performs the keystone correction processing to an image applied with the image processing for the pixel shift control performed by the image generation processing unit 33. Therefore, the keystone correction processing performed by the keystone correction processing unit 34 is different from the keystone correction processing performed by the keystone correction processing unit 10A of the system controller 10 because the keystone correction processing by the keystone correction processing unit 10A is performed to an image that is not yet applied with the image processing for the pixel shift control. However, the keystone correction processing unit 34 and the keystone correction processing unit 10A of the system controller 10 perform the keystone correction processing by applying the same procedure.

The communication control unit 35 includes a communication interface used for communicating with the system controller 10, and receives setting information used for turning or setting ON/OFF of the pixel shift control from the system controller 10.

In this configuration, the communication control unit 35 controls the ON/OFF switching of the switches 36 and 37. Each of the switches 36 and 37 is switched between ON and OFF based on the ON/OFF switching control by the communication control unit 35 when the communication control unit 35 receives the setting information from the system controller 10. Specifically, when the switches 36 and 37 receive an instruction indicating that the setting of the pixel shift control is ON, the switches 36 and 37 are switched to a line including the image generation processing unit 33 and the keystone correction processing unit 34 as illustrated in FIG. 19A. By contrast, when the switches 36 and 37 receive an instruction indicating that the setting of the pixel shift control is OFF, the switches 36 and 37 is switched to another line not including the image generation processing unit 33 and the keystone correction processing unit 34 as illustrated in FIG. 19B.

When the pixel shift control is turned ON as illustrated in FIG. 19A, the system controller 10 inputs image data of an image to the pixel-shift image processing unit 32, and then the image generation processing unit 33 generates images for the pixel-shift control based on the image data input from the system controller 10, to be synchronized with the movement of the movable unit 55. In this processing, two images are generated from one image.

Then, the keystone correction processing unit 34 performs the keystone correction processing to the images generated by the image generation processing unit 33 based on information of the inclination angle detected by the inclination detection unit 31. The relationship between the inclination angle and the correction amount for the keystone correction can be set and stored in a memory in advance.

The image, which has received the keystone correction processing, is output from the pixel-shift image processing unit 32 to the DMD controller 13.

When the pixel shift control is turned OFF as illustrated in FIG. 19B, image data of an image input to the pixel-shift image processing unit 32 from the system controller 10 is output to the DMD controller 13 without performing the processing in the pixel-shift image processing unit 32. When the pixel shift control is turned OFF as illustrated in FIG. 19B, the keystone correction processing is performed by the keystone correction processing unit 10A of the system controller 10 when the keystone correction processing is required.

When the pixel shift control is turned OFF as illustrated in FIG. 19B, the pixel-shift image processing unit 32 including the image generation processing unit 33 and the keystone correction processing unit 34 can be set to a standby mode (i.e., power supply is turned OFF), with which power consumption can be reduced.

Figure 20:
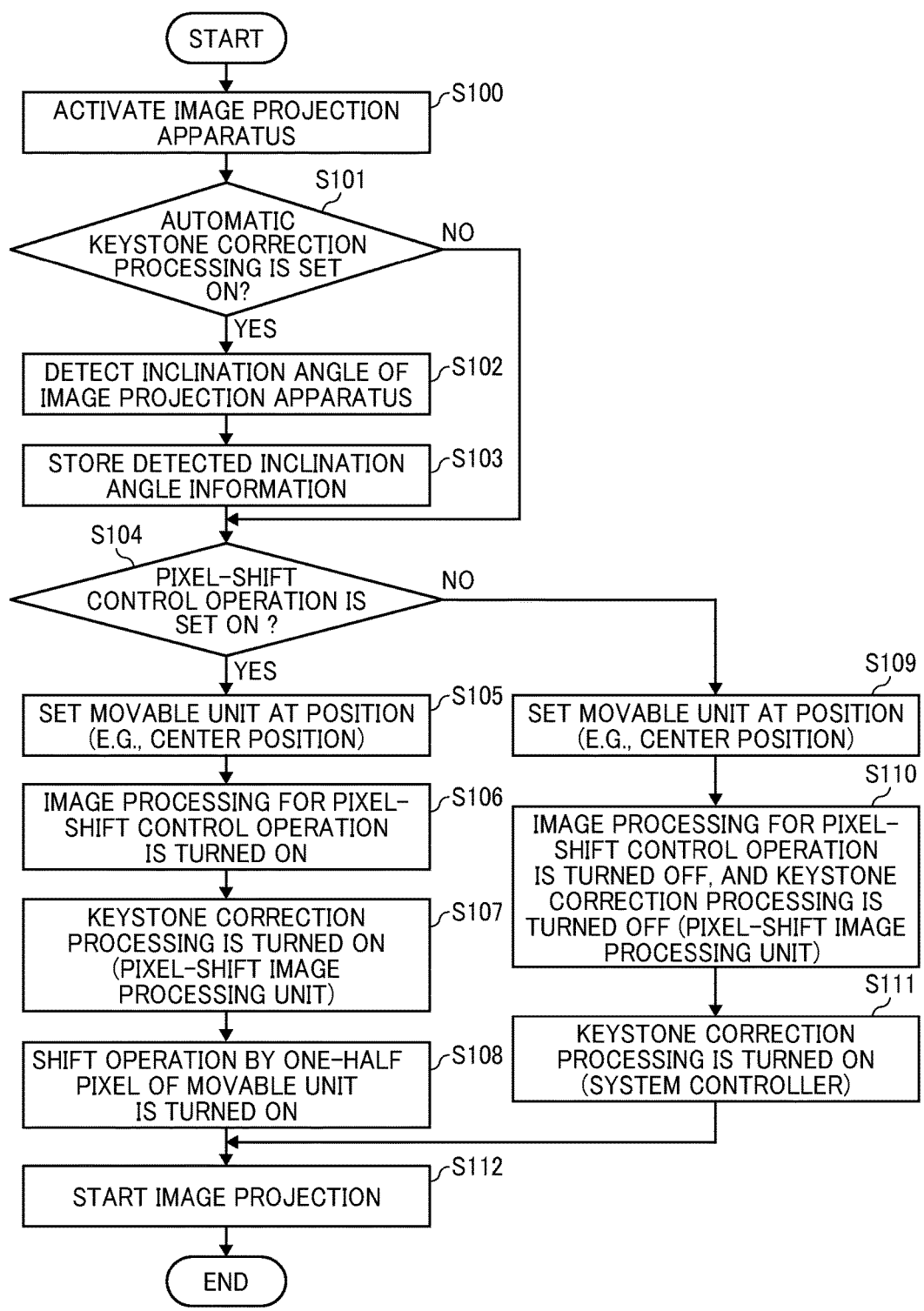
FIG. 20 is an example of a flowchart illustrating steps of processing from an activation of an image projection apparatus to a start of image projection by using the image projection apparatus.

FIG. 20 is an example of a flowchart illustrating the steps of processing from an activation of the image projection apparatus 1A to a start of image projection by using the image projection apparatus 1A.

When the power supply to the image projection apparatus 1A is turned ON, and the image projection apparatus 1A is activated (S100), the image projection apparatus 1A determines whether an automatic keystone correction processing is set ON or OFF (S101). For example, the ON/OFF setting of the automatic keystone correction processing can be stored in a memory such as the non-volatile memory 26 in advance. The automatic keystone correction processing can be performed when the image projection apparatus 1A is activated, in which the installation state of the image projection apparatus 1A is detected, and the keystone correction processing is performed to image data of an image input to the image projection apparatus 1A when to start the image projection.

When the image projection apparatus 1A determines that the automatic keystone correction is set ON (S101: YES), the inclination detection unit 31 detects an inclination angle of the image projection apparatus 1A (S102). Then, information of the detected inclination angle is stored in a memory such as the non-volatile memory 26 or the like (S103). By contrast, when the image projection apparatus 1A determines that the automatic keystone correction processing is set OFF (S101: NO), processing of S102 and S103 are not executed.

Then, the image projection apparatus 1A determines whether the pixel shift control is turned or set ON or OFF (S104), wherein the pixel shift control corresponds to performing the higher-resolution mode.

When the image projection apparatus 1A determines that the pixel shift control is turned ON (S104: YES), the movable unit 55 is set at an initial position (e.g., center position), which is used when performing the pixel shift control (S105). In general, the position of the movable unit 55 is not known before activating the image projection apparatus, in which the position of the movable unit 55 may not be set at the optimum position for starting the image projection. Therefore, the movable unit 55 is set at the optimum position such as the initial position by performing the above described centering. Further, the switches 36 and 37 are switched to the line including the image generation processing unit 33 and the keystone correction processing unit 34 to connect the image input line to the line including the image generation processing unit 33 and the keystone correction processing unit 34 as illustrated in FIG. 19A.

Then, the image generation processing unit 33 performs the image processing for the pixel shift control (S106), and the keystone correction processing unit 34 performs the keystone correction processing (S107). When the keystone correction processing is performed, a correction value is calculated from information of the inclination angle stored in the non-volatile memory 26 at the processing of S103, and then the keystone correction processing is performed based on the correction value. The image applied with the image processing for the pixel shift control and the keystone correction processing is transmitted to the DMD 551.

Then, the shift operation by one-half pixel of the movable unit 55 is turned ON, and the pixel shift control for the higher resolution mode is started by synchronizing the image applied with the image processing for the pixel shift control and the movement of the movable unit 55 (S108).

By contrast, when the image projection apparatus 1A determines that the pixel shift control is turned or set OFF (S104: NO), the movable unit 55 is set at the initial position (e.g., center position), which is used when the pixel shift control is not performed (S109). When the image projection apparatus 1A determines that the pixel shift control is turned OFF (S104: NO), the switches 36 and 37 are switched to another line not including image generation processing unit 33 and the keystone correction processing unit 34 to connect the image input line to another line not including image generation processing unit 33 and the keystone correction processing unit 34 as illustrated in FIG. 19B, with which the image processing for the pixel shift control by the image generation processing unit 33 is turned OFF, and the keystone correction processing by the keystone correction processing unit 34 is turned OFF (S110). In a case of FIG. 19B, since the switches 36 and 37 are switched to another line not including image generation processing unit 33 and the keystone correction processing unit 34, the pixel shift control by the image generation processing unit 33 and the keystone correction processing by the keystone correction processing unit 34 are both turned OFF at step S110. By turning off the power supply to the pixel-shift image processing unit 32 including the image generation processing unit 33 and the keystone correction processing unit 34, the power consumption can be reduced.

When the image projection apparatus 1A determines that the pixel shift control is turned OFF (S104: NO), the keystone correction processing unit 10A of the system controller 10 performs the keystone correction processing (S111). When the keystone correction processing is to be performed, a correction value is calculated from the information of inclination angle stored in the non-volatile memory 26 at the processing of S103, and then the keystone correction processing is performed based on the correction value.

When the processing of step S108 or S111 is completed, and the image projection is set ready, the image projection is started (S112). In the sequence of FIG. 20, the projection of the input image is muted from the activation of the image projection apparatus 1A (S101) until the start of projection by the image projection apparatus 1A (S112), but an image such as a startup screen image can be projected during steps S101 to S112.

Figure 21:
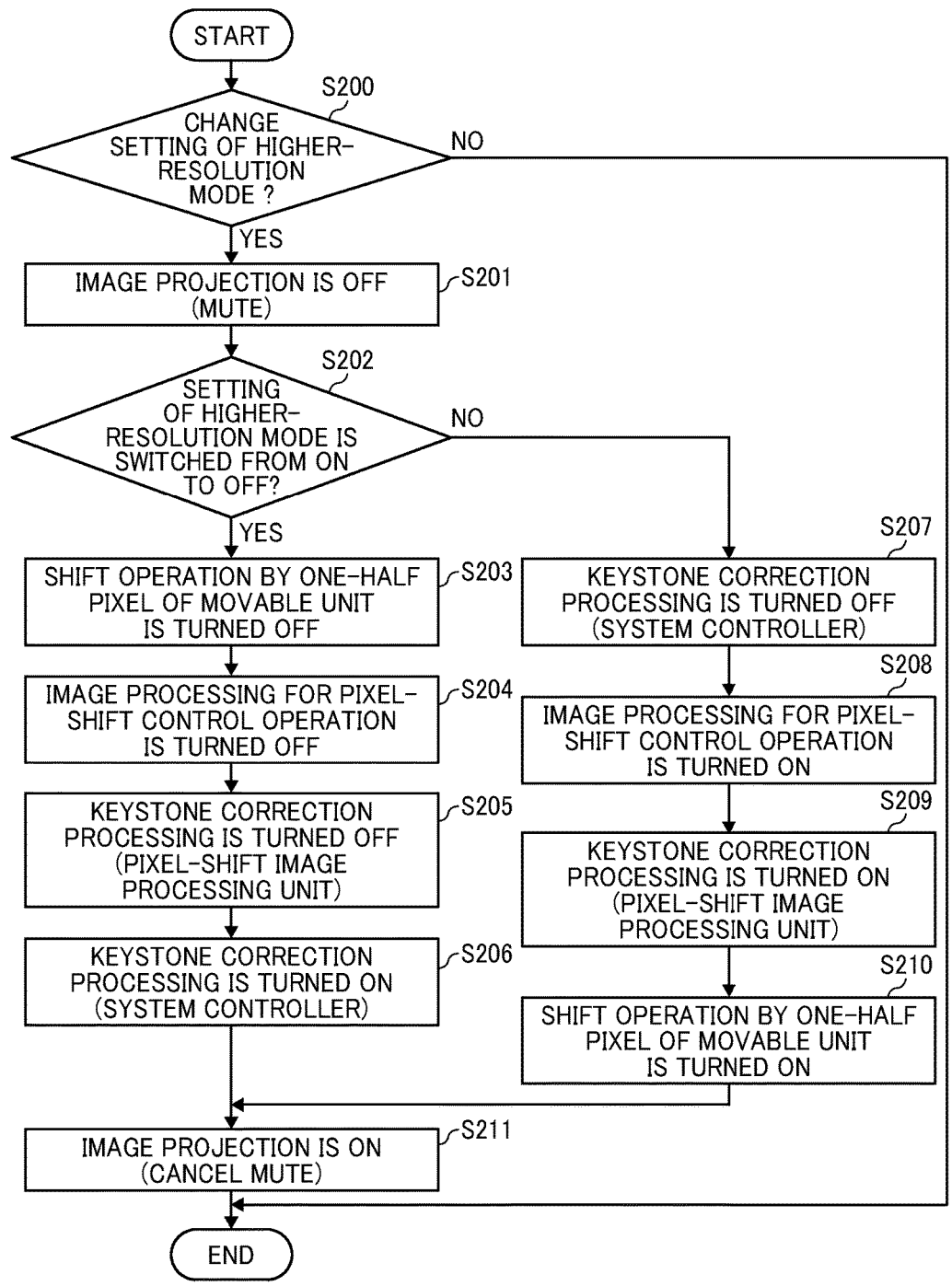
FIG. 21 is an example a flowchart illustrating the steps of processing when ON/OFF setting of the pixel shift control (i.e., higher-resolution mode) is switched during an image projection.

Hereinafter, a description is given of switching of ON/OFF setting of the pixel shift control (i.e., higher-resolution mode) during the image projection. FIG. 21 is an example a flowchart illustrating the steps of processing when the ON/OFF setting of the pixel shift control (i.e., higher-resolution mode) is switched during the image projection.

At first, the image projection apparatus 1A determines whether the image projection apparatus 1A receives an instruction of changing the setting of the higher-resolution mode (S200). When the image projection apparatus 1A determines that the image projection apparatus 1A does not receive the change instruction (S200: NO), the sequence of FIG. 21 is not performed.

By contrast, when the image projection apparatus 1A determines that the image projection apparatus 1A receives the change instruction (S200: YES), the image projection is turned OFF to set a mute status (S201). At step S201, the image projection is muted. If an image is projected during the mode switching (i.e., switching between ON and OFF of the higher-resolution mode), blurring of the image or the like occurs due to switching of image processing, and a user may feel uncomfortableness or annoyance seeing such image. By stopping the projection of the image by setting the mute status, the user does not see the image during the mode switching.

Then, the image projection apparatus 1A determines whether the setting of the higher-resolution mode is switched from OFF to ON or from ON to OFF (S202). If the setting of the higher-resolution mode is switched from ON to OFF (S202: YES), the shift operation by one-half pixel of the movable unit 55 is turned OFF (S203). Further, the image processing for the pixel shift control of the image generation processing unit 33 and the keystone correction processing of the keystone correction processing unit 34 are turned OFF by switching the switches 36 and 37 as above described with reference to FIG. 19B (S204, S205).

Then, the keystone correction processing of the keystone correction processing unit 10A of the system controller 10 is turned ON (S206), and the keystone correction processing unit 10A performs the keystone correction processing to generate an image.

By contrast, if the setting of the higher-resolution mode is switched from OFF to ON (S202: NO), the keystone correction processing of the keystone correction processing unit 10A of the system controller 10 is turned OFF (S207). Further, the image processing for the pixel shift control of the image generation processing unit 33 and the keystone correction processing of the keystone correction processing unit 34 are turned ON by switching the switches 36 and 37 as above described with reference to FIG. 19A (S208, S209), and then the image processing for the pixel shift control and the keystone correction processing are respectively performed by the image generation processing unit 33 and the keystone correction processing unit 34 to generate an image.

Then, the shift operation by one-half pixel of the movable unit 55 is turned ON, and the pixel shift control for the higher resolution mode is started by synchronizing the image applied with the image processing for the pixel shift control and the movement of the movable unit 55 (S210).

When the processing of step S 206 or S210 is completed, and the image generation is completed, the mute is canceled, and then the projection of the image is resumed (S211).

As to the above described image projection apparatus 1A having capability of the higher resolution mode by performing the pixel shift control, when the keystone correction process is performed at the time of performing the pixel shift control, the keystone correction processing is performed to an image applied with the image processing for the pixel shift control to suppress image degradation due to the keystone correction processing, with which image quality when the keystone correction process is performed can become a satisfactory level.

Further, when the pixel shift control is not performed (S202: NO), the keystone correction processing is performed by the system controller 10 while the image generation processing unit 33 and the keystone correction processing unit 34 included in the pixel-shift image processing unit 32 are set at a standby state, with which power consumption can be reduced.

(Second Embodiment)

Hereinafter, a description is given of an image projection apparatus of a second embodiment of the present invention. The description of the second embodiment similar to those of the first embodiment will be appropriately omitted.

FIG. 22 illustrates another example of a functional block diagram of a pixel-shift image processing unit 32a of the second embodiment. FIG. 22A illustrates one case when the pixel shift control is turned ON, and FIG. 22B illustrates another case when the pixel shift control is turned OFF.

Similar to the above described configuration illustrated in FIG. 19, the pixel-shift image processing unit 32a of FIG. 22 includes, for example, the image generation processing unit 33, the keystone correction processing unit 34, the communication control unit 35, and the switches 36 and 37. However, different from the configuration illustrated in FIG. 19, the keystone correction processing is performed by the pixel-shift image processing unit 32 when the pixel shift control is turned ON and also when the pixel shift control is turned OFF. When the configuration of FIG. 22 is employed, the image generation processing unit 33 is one processor, and the keystone correction processing unit 34 is another processor.

The configuration illustrated in FIG. 22 indicates one example configuration of the pixel-shift image processing unit 32a when the system controller 10 does not include the keystone correction processing unit 10A. Lately, it has been considered to use a processor chip used in other apparatuses such as television monitors as the main processor chip (i.e., system controller 10) of the image projection apparatus. In this case, the system controller 10 does not include the keystone correction processing unit 10A, and thereby the keystone correction is performed by the pixel-shift image processing unit 32 when the pixel shift control is turned ON and also when the pixel shift control is turned OFF as illustrated in FIG. 22.

When the pixel shift control is turned ON as illustrated in FIG. 22A, the system controller 10 inputs image data of an image to the pixel-shift image processing unit 32, and then the image generation processing unit 33 generates images for the pixel-shift control based on the image data input from the system controller 10, to be synchronized with the movement of the movable unit 55. In this processing, two images are generated from one image.

Then, the keystone correction processing unit 34 performs the keystone correction processing to the image generated by the image generation processing unit 33 based on the inclination angle detected by the inclination detection unit 31. The image, which has received the keystone correction processing, is output from the pixel-shift image processing unit 32 to the DMD controller 13.

When the pixel shift control is turned OFF as illustrated in in FIG. 22B, image data of an image input to the pixel-shift image processing unit 32 from the system controller 10 is input to the keystone correction processing unit 34 without performing the processing at the image generation processing unit 33. Then, the keystone correction processing unit 34 performs the keystone correction processing to the input image data based on information of the inclination angle detected by the inclination detection unit 31. The image, which has received the keystone correction processing, is output from the pixel-shift image processing unit 32 to the DMD controller 13. As to the configuration of the second embodiment, when the pixel shift control is turned OFF as illustrated in FIG. 22B, the keystone correction processing is performed by the keystone correction processing unit 34 because the system controller 10 does not include the keystone correction processing unit 10A as described above.

When the pixel shift control is turned OFF as illustrated in FIG. 22B, the image generation processing unit 33 can be set to a standby mode (i.e., power supply is turned OFF), with which power consumption can be reduced.

(Third Embodiment)

In the above described first embodiment, the inclination detection unit 31 employs the accelerometer for detecting the inclination of the image projection apparatus 1A in the vertical direction, and the keystone correcting process is performed in the vertical direction, but not limited thereto. The control method described in this disclosure can be also applied to the distortion correction of the projected image when a shape of the projected image is distorted in the horizontal direction, and the curve distortion correction of the projected image when the projection face is not a flat face.

Therefore, the image projection apparatus 1A can be also preferably configured to detect the inclination in the horizontal direction, and to perform the keystone correction processing in the horizontal direction.

A device for detecting the inclination of the image projection apparatus 1A in the horizontal direction for calculating the amount of the keystone correction processing in the horizontal direction can employ known or novel inclination detection devices or units. For example, when the image projection apparatus 1A includes an image capture device such as a camera, an image projected onto a projection face is captured by the image capture device, and then the keystone correction processing in the horizontal direction can be performed based on the captured image. In this configuration, the inclination detection unit 31 includes the image capture device.

Further, the image projection apparatus 1A can be also preferably configured to perform the curvature correction processing for correcting the curvature of image when the projection face is not the flat face.

A device for calculating the correction amount of the curvature correction can employ known or novel inclination detection devices or units. For example, when the image projection apparatus 1A includes an image capture device such as a camera, an image projected onto a projection face is captured by the image capture device, and then the curvature correction can be performed based on the captured image. Further, when the image projection apparatus 1A includes a distance measurement apparatus (e.g., distance or range sensor), the curvature correction can be performed based on the measured distance to the projection face.

As to the image projection apparatus 1A that can achieve the higher resolution by performing the pixel shift control, when the correction processing in the horizontal direction or the curvature correction is performed when performing the pixel shift control, the above described same issue when performing the keystone correction processing in the vertical direction may occur. Therefore, as to the third embodiment, any one of the keystone correction processing unit 10A and the keystone correction processing unit 34 performs the keystone correction processing in the vertical direction, the keystone correction processing in the horizontal direction, and the curvature correction processing based on the detection result of the inclination detection unit 31. With this configuration, the image deterioration can be suppressed, and the image quality becomes favorably when the keystone correction processing in the horizontal direction and/or the curvature correction processing are performed.

(Fourth Embodiment)

In the above-described first embodiment, the image projection apparatus 1A using a digital light processing (DLP) is described as an example of image projection apparatuses, in which the image generation element such as the DMD 551 is reciprocally moved, but not limited to thereto. This disclosure can be applied to any image projection apparatuses having a configuration that can perform the higher resolution mode operation (i.e., pixel-shift control operation) to achieve higher image resolution by controlling the reciprocal movement of the image generation element.

Further, in the above-described first embodiment, the pixel-shift control operation is performed by shifting or moving the image generation element (e.g., DMD 551), but not limited thereto. For example, the pixel-shift control operation can be performed by moving or shifting a position of an optical element (e.g., one lens configuring an optical projection unit) disposed in a light path of the light emitted from the light source to generate an image such as intermediate image. For example, as to a projector of digital light processing (DLP) type, instead of performing the reciprocal movement of the image generation element, the reciprocal movement control operation can be performed for an optical element disposed at a position after the image generation element.

Figure 23:
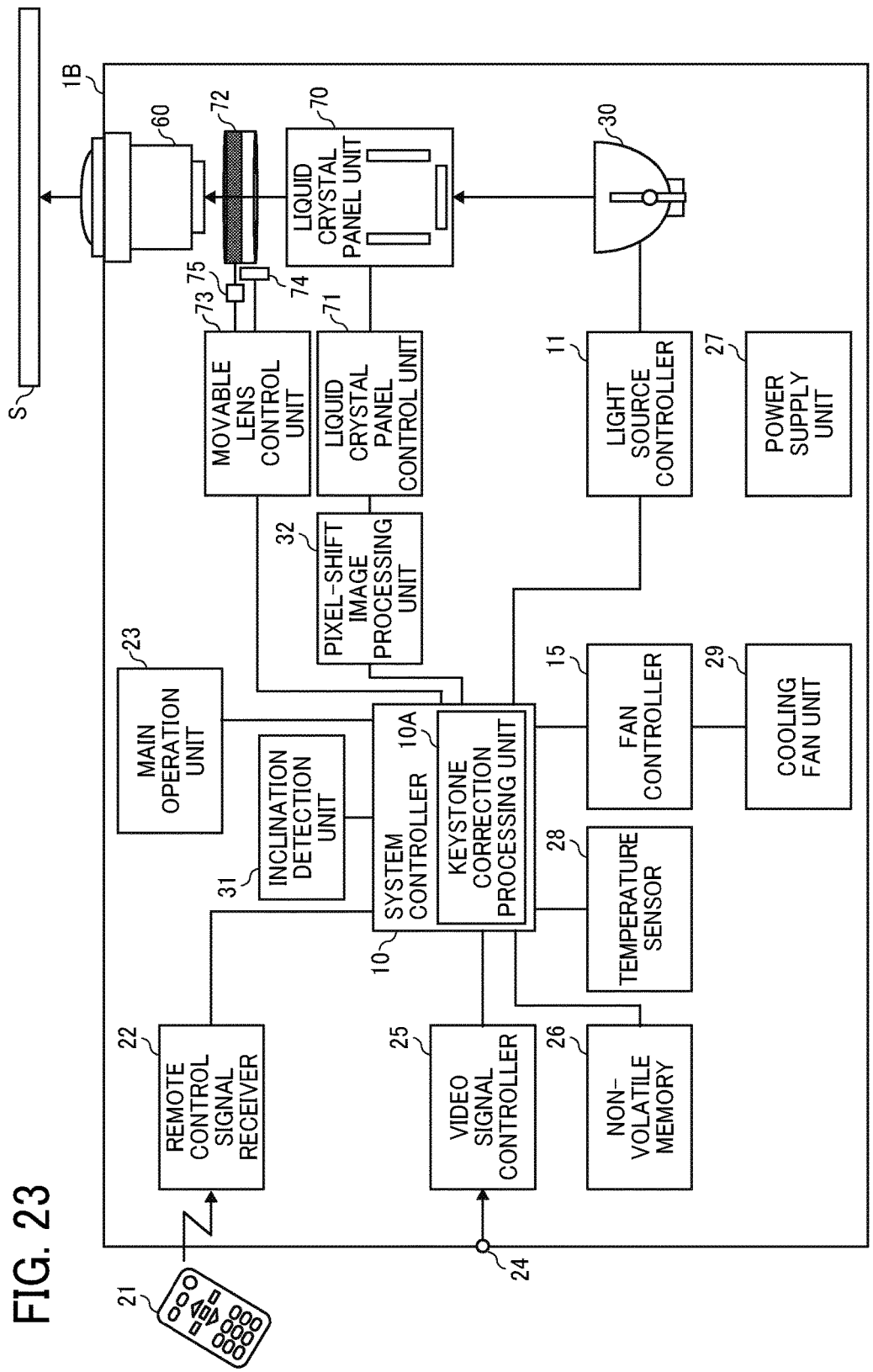
FIG. 23 illustrates another example of a functional block diagram of an image projection apparatus.

In the fourth embodiment, an image projection apparatus of a liquid crystal type is described. FIG. 23 illustrates an example of a functional block diagram of an image projection apparatus 1B of the fourth embodiment. FIG. 23 illustrates an example of the image projection apparatus 1B of a liquid crystal type.

As illustrated in FIG. 23, the image projection apparatus 1B of the fourth embodiment includes, for example, the image generation element such as a liquid crystal panel unit 70 that generates an image using light emitted from the light source such as the light source 30, an optical element such as a movable lens 72 placed or disposed after the image generation element in a light path, a shift unit such as a lens movement unit 75 that shifts or moves a position of the optical element, in which images can be projected while reciprocally moving or shifting the optical element by the shift unit in the pixel shift mode, in which the image generation processing unit such as the image generation processing unit 33 generates images for the pixel shift mode based on image data of an image input to the image projection apparatus 1B, and the keystone correction processing unit such as the keystone correction processing unit 34 performs the keystone correction processing to the images generated by the image generation processing unit 33.

As illustrated in FIG. 23, the image projection apparatus 1B includes, for example, a system controller 10, a light source controller 11, an inclination detection unit 31, a pixel-shift image processing unit 32, a fan controller 15, a remote control signal receiver 22, a main operation unit 23, an input terminal 24, a video signal controller 25, a non-volatile memory 26, a power supply unit 27, a temperature sensor 28, a cooling fan unit 29, a light source 30, a liquid crystal panel unit 70, a liquid crystal panel control unit 71, a movable lens 72, a movable lens control unit 73, a position detector 74, a lens movement unit 75, and an optical projection unit 60 to project an image onto the screen S. Further, the image projection apparatus 1B includes, for example, a remote controller 21 as a remote control means or units. Hereinafter, portions different from the image projection apparatus 1A described with reference to FIG. 5 are described.

The liquid crystal panel unit 70 includes, for example, liquid crystal panels of red, green, and blue (RGB), and the liquid crystal panel control unit 71 controls each of the liquid crystal panels to generate an image. The light emitted from the light source 30 to the liquid crystal panel unit 70 and reflected by the liquid crystal panel unit 70 is projected onto the movable lens 72. The movable lens 72 is disposed at a position after the liquid crystal panel unit 70 used as the image generation element in the light path of the light emitted from the light source 30. In this configuration, the lens movement unit 75 is provided as a shift unit for the movable lens 72 to move or shift a position of the movable lens 72. For example, the lens movement unit 75 employs, a piezoelectric element, an electromagnetic actuator, which is a combination of a voice coil and a magnet, a motor, or the like. The lens movement unit 75 is controlled by the movable lens control unit 73. The movable lens control unit 73 controls the inclination of the movable lens 72 by using the lens movement unit 75 so that the projected image is shifted by one-half pixel.

Further, when moving or shifting the movable lens 72, the pixel-shift image processing unit 32 performs the image processing for the pixel shift control to the input image signal or data, and synchronizes the generated image signals with the movement of the movable lens 72 to enhance the resolution of projected images.

Further, the position of the movable lens 72 can be detected by the position detector 74 used as a position sensor provided in the vicinity of the movable lens 72. The movable lens control unit 73 detects whether the movable lens 72 is at a target position or not based on a detection result of the position detector 74. Specifically, the movable lens control unit 73 detects whether the movable lens 72 operates normally or not, and inputs a determination result to the system controller 10. Further, the position detector 74 can employ any type of position sensors such as a light sensor as long as the position detector 74 can detect the movement of the movable lens 72 correctly.

The image projection apparatus 1B is capable of setting ON/OFF of the pixel shift control (i.e., higher-resolution mode), and when the pixel shift control is turned ON, the movable lens 72 is driven, and when the pixel shift control is turned OFF, the movable lens 72 is not driven. Similar to the first embodiment, in the image projection apparatus 1B of the fourth embodiment, when the pixel shift control (i.e., higher-resolution mode) is turned ON, the keystone correction processing is performed by the keystone correction processing unit 34 of the pixel-shift image processing unit 32, and when the pixel shift control (i.e., higher-resolution mode) is turned OFF, the keystone correction processing is performed by the keystone correction processing unit 10A of the system controller 10.

As above described, the image projection apparatus 1B of the fourth embodiment is configured to control the reciprocal movement of the optical element, with which the image quality can become a satisfactory level even when the keystone correction processing is performed.

(Fifth Embodiment)

In the above described fourth embodiment, the image projection apparatus of a liquid crystal type is used as the image projection apparatus 1B, in which images can be projected in the pixel shift mode by reciprocally moving the movable lens 72 disposed after the image generation element such as the liquid crystal panel unit 70. Further, the image projection apparatus can be configured to dispose an optical element having a birefringence property between the image generation element and the projection optical system such as the optical projection unit 60.

Since the light that enters the optical element having the birefringence property is separated into two rays such as normal ray and extraordinary rays, the pixel shift control can be performed by performing the image processing for the pixel shift control in this configuration.

Figure 24:
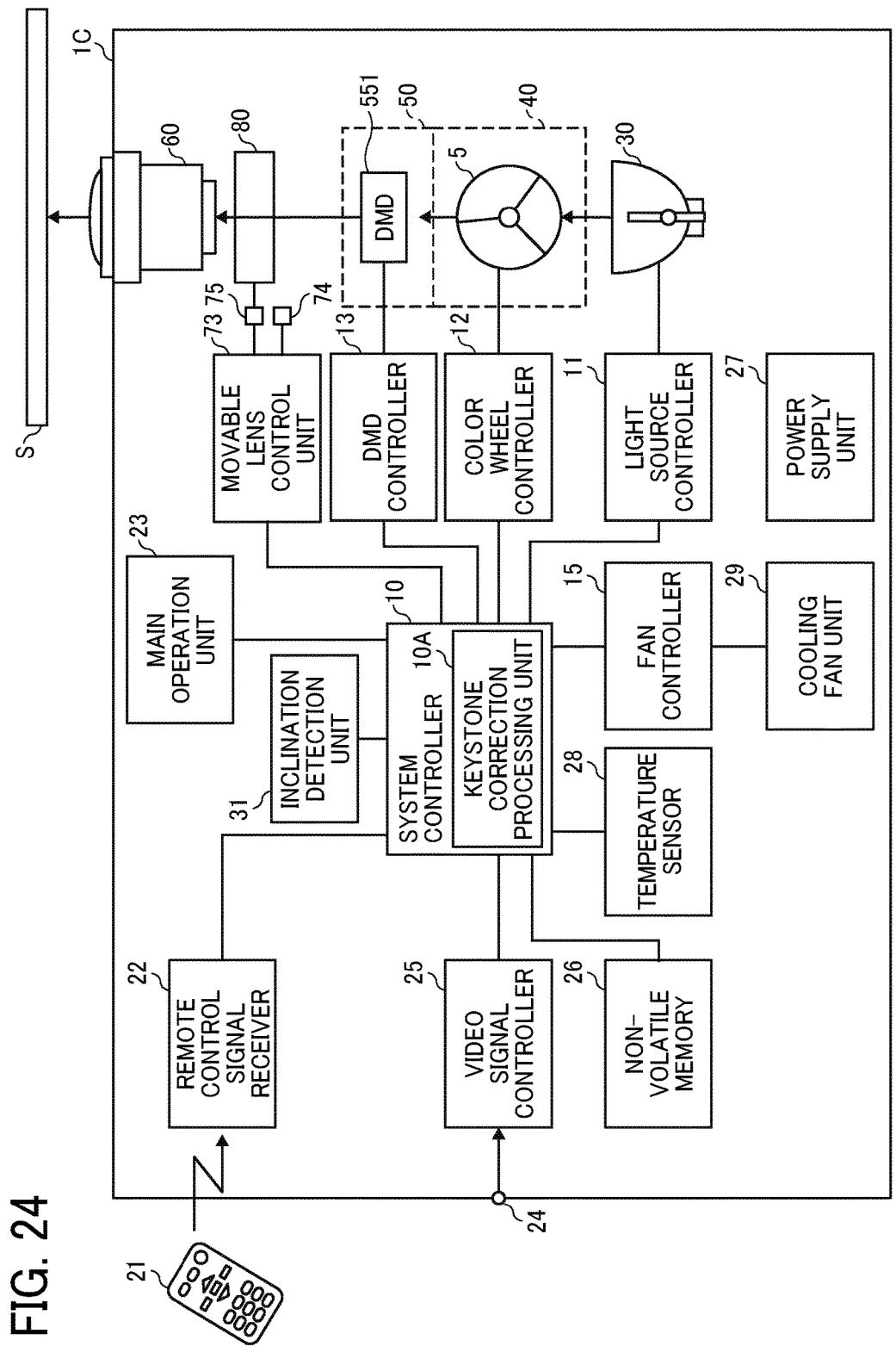
FIG. 24 illustrates another example of a functional block diagram of an image projection apparatus.
Figure 25:
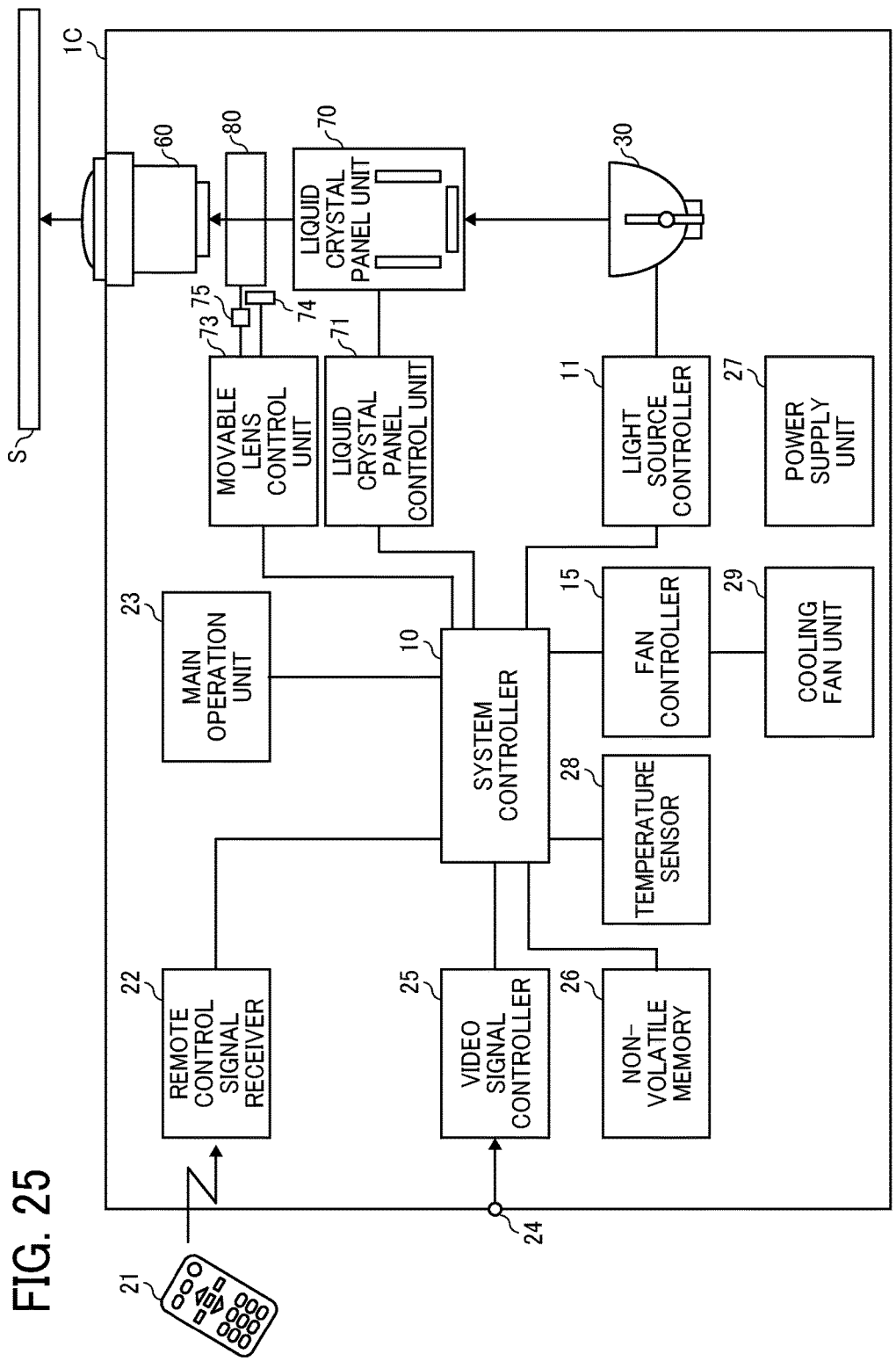
FIG. 25 illustrates another example of a functional block diagram of an image projection apparatus.

Therefore, as illustrated in FIGS. 24 and 25, an image projection apparatus 1C of the fifth embodiment includes, for example, the image generation element such as the DMD 551 or the liquid crystal panel unit 70 that generates an image using light emitted from the light source such as the light source 30, a projection lens unit such as the optical projection unit 60 that projects the image generated by the image generation element, an optical element having birefringence property such as a movable lens 80 disposed between the image generation element and the projection lens unit, a shift unit such as the lens movement unit 75 that shifts a position of the optical element having the birefringence property such as the movable lens 80. In this configuration, the pixel shift mode is performed by reciprocally moving or shifting the position of the projected images by using the optical element having birefringence property and the shift unit, in which the image generation processing unit such as the image generation processing unit 33 generates images for the pixel shift mode based on the input image, and the keystone correction processing unit such as the keystone correction processing unit 34 performs the keystone correction processing to the images generated by the image generation processing unit.

For example, the image projection apparatus 1C of the fifth embodiment can be configured as illustrated in FIGS. 24 and 25. In a configuration of FIG. 24, the DMD 551 is used as the image generation element, and in a configuration of FIG. 25, the liquid crystal panel unit 70 is used as the image generation element, in which the movable lens 80 is used as the optical element having the birefringence property, which can be moved or shifted with respect to the optical projection unit 60 when the pixel shift control is performed similar to the above described movable lens 72.

As to the image projection apparatus 1C of the fifth embodiment including the optical element having the birefringence property, the image quality can become a satisfactory level even when the keystone correction processing is performed.

Further, in the above described first to fifth embodiments, a horizontally placed projector is described as an example of the image projection apparatuses, but the above described embodiments can be also applied to a vertically placed ultra-short focus type projector using an optical reflection.

As to the above described embodiments, the image projection apparatus can output images having satisfactory image quality even when both of the keystone correction and the pixel shift control are performed.

Numerous additional modifications and variations for the modules, the units, and the image projection apparatuses are possible in light of the above teachings. It is therefore to be understood that within the scope of the appended claims, the description of present disclosure may be practiced otherwise than as specifically described herein. For example, elements and/or features of different examples and illustrative embodiments may be combined each other and/or substituted for each other within the scope of present disclosure and appended claims.

What is claimed is:

1. An image projection apparatus comprising: an image generation element configured to form an image to be projected using light emitted from a light source; a shift unit configured to shift a position of the image generation element when a pixel shift mode is set by a main controller; and circuitry configured to generate, when the pixel shift mode is set by the main controller images used for the pixel shift mode based on image data input to the image projection apparatus, perform keystone correction processing to the generated images, and cause the processed images to be projected as the image by reciprocally shifting the position of the image generation element by the shift unit, or to perform, when the pixel shift mode is not set by the main controller, the keystone correction processing to image data input to the image projection apparatus to generate an image applied with the keystone correction processing, and project the generated image without shifting the position of the image generation element by the shift unit, wherein the circuitry includes an image generation processing unit and a first keystone correction processing unit, and a second keystone correction processing unit, wherein the circuitry is further configured to, when the pixel shift mode is set by the main controller, generate the images for the pixel shift mode by using the image generation processing unit, and then perform the keystone correction processing to the generated images by using the first keystone correction processing unit, and then control a projection unit to project the images by shifting the image generation element by the shift unit, and when the pixel shift mode is not set by the main controller and the image generation element is not shifted by the shift unit, perform the keystone correction processing to the image data input to the image projection apparatus by using the second keystone correction processing unit, and then control the projection unit to project the image applied with the keystone correction processing.

2. The image projection apparatus of claim 1, wherein the circuitry is further configured to, when the pixel shift mode is not set by the main controller, set at least one of the image generation processing unit and the first keystone correction processing unit included in the circuitry at a standby mode by turning off power supply.

3. The image projection apparatus of claim 1, wherein the second keystone correction processing unit is disposed in a main controller of the image projection apparatus, and the image generation processing unit and the first keystone correction processing unit are disposed in another controller in the image projection apparatus, different from the main controller.

4. An image projection apparatus comprising: an image generation element configured to form an image to be projected using light emitted from a light source; an optical element disposed at a position after the image generation element in a light path of the light emitted from the light source; a shift unit configured to shift the position of the optical element when a pixel shift mode is set by a main controller; and circuitry configured to generate, when the pixel shift mode is set by the main controller, images used for the pixel shift mode based on image data input to the image projection apparatus, perform keystone correction processing to the generated images, and cause the processed images to be projected as the image by reciprocally shifting the position of the optical element by the shift unit, or perform, when the pixel shift mode is not set by the main controller, the keystone correction processing to image data input to the image projection apparatus to generate an image applied with the keystone correction processing, and project the generated image without shifting the position of the optical element by the shift unit, wherein the circuitry includes an image generation processing unit and a first keystone correction processing unit, and a second keystone correction processing unit, wherein the circuitry is further configured to, when the pixel shift mode is set by the main controller, generate the images for the pixel shift mode by using the image generation processing unit, and then perform the keystone correction processing to the generated images by using the first keystone correction processing unit, and then control a projection unit to project the images by shifting the optical element by the shift unit, and when the pixel shift mode is not set by the main controller and the optical element is not shifted by the shift unit, perform the keystone correction processing to the image data input to the image projection apparatus by using the second keystone correction processing unit, and then control the projection unit to project the image applied with the keystone correction processing.

5. The image projection apparatus of claim 4, wherein the circuitry is further configured to, when the pixel shift mode is not set by the main controller, set at least one of the image generation processing unit and the first keystone correction processing unit included in the circuitry at a standby mode by turning off power supply.

6. The image projection apparatus of claim 4, wherein the second keystone correction processing unit is disposed in the main controller of the image projection apparatus, and the image generation processing unit and the first keystone correction processing unit are disposed in another controller in the image projection apparatus, different from the main controller.

* * * * *